US009756517B1

(12) United States Patent
Dressler et al.

(10) Patent No.: US 9,756,517 B1
(45) Date of Patent: *Sep. 5, 2017

(54) EFFICIENT DEPLOYMENT OF MOBILE TEST UNITS TO GATHER LOCATION-DEPENDENT RADIO-FREQUENCY DATA

(71) Applicant: Polaris Wireless, Inc., Mountain View, CA (US)

(72) Inventors: Robert Morris Dressler, Los Altos Hills, CA (US); James Vincent Steele, Santa Clara, CA (US); Robert Lewis Martin, Antioch, CA (US); Manlio Allegra, Los Altos Hills, CA (US); Mark Douglas Reudink, Los Altos, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/142,933

(22) Filed: Apr. 29, 2016

Related U.S. Application Data

(63) Continuation of application No. 11/733,608, filed on Apr. 10, 2007, now Pat. No. 9,351,171.

(Continued)

(51) Int. Cl.
*H04W 24/00* (2009.01)
*H04W 24/08* (2009.01)
*H04B 17/309* (2015.01)

(52) U.S. Cl.
CPC .......... *H04W 24/08* (2013.01); *H04B 17/309* (2015.01)

(58) Field of Classification Search
CPC .............................. H04W 24/08; H04B 17/309
(Continued)

(56) References Cited

U.S. PATENT DOCUMENTS 5,793,934 A 8/1998 Bauer
5,926,762 A 7/1999 Arpee et al.
(Continued)

FOREIGN PATENT DOCUMENTS

DE 19705903 A1 8/1998
EP 1081972 A 3/2001
(Continued)

OTHER PUBLICATIONS

"Office Action" issued in counterpart French Application No. 07 841 707.8, dated Aug. 11, 2009, Publisher: EPO, Published in: FR.
(Continued)

*Primary Examiner* — Nghi H Ly
(74) *Attorney, Agent, or Firm* — McGeary Cukor LLC; Jason Paul DeMont; Kenneth Ottesen

(57) ABSTRACT

A technique for designing and testing drive-test plan for gathering location-dependent RF data is disclosed. In accordance with some embodiments of the present invention, one candidate drive-test plan is chosen for implementation over a second based on an economic cost-benefit analysis of both plans. This is in marked contrast to, for example, a selection of drive-test plans, or the design of a drive-test plan, based on a calibration-cost analysis, in which the data estimated to be the most effective to calibrate a radio-frequency tool is sought for a given cost or the least cost. Although a data-estimated-to-be-most-effective-to-calibrate-a-radio-frequency-tool vs. cost analysis is a species of cost-benefit analyzes in general, it is not an economic cost-benefit analysis because a data-estimated-to-be-most-effective-to-
(Continued)

calibrate-a-radio-frequency-tool vs. cost analysis has deficiencies that an economic cost-benefit analysis does not.

20 Claims, 16 Drawing Sheets

Related U.S. Application Data

(60) Provisional application No. 60/826,946, filed on Sep. 26, 2006.

(58) Field of Classification Search
USPC .... 455/67.11, 456.1, 69, 522, 418; 370/328, 370/338
See application file for complete search history.

(56) References Cited

U.S. PATENT DOCUMENTS

| | | | |
|---|---|---|---|
| 6,006,095 | A | 12/1999 | Bernardin et al. |
| 6,052,583 | A | 4/2000 | Bernardin |
| 6,167,258 | A | 12/2000 | Schmidt et al. |
| 6,336,035 | B1 | 1/2002 | Somoza et al. |
| 6,418,317 | B1 | 7/2002 | Cuffaro et al. |
| 6,587,690 | B1 | 7/2003 | Di Huo et al. |
| 6,711,404 | B1 | 3/2004 | Arpee et al. |
| 6,754,475 | B1 | 6/2004 | Harrison et al. |
| 6,842,726 | B1 | 1/2005 | Scharosch et al. |
| 6,937,539 | B2 | 8/2005 | Kervern et al. |
| 7,065,351 | B2 | 6/2006 | Carter et al. |
| 7,460,505 | B2 | 12/2008 | Spain |
| 9,351,171 | B2 * | 5/2016 | Dressler ............... H04W 16/18 |
| 2003/0234937 | A1 | 12/2003 | Akao et al. |
| 2005/0032520 | A1 | 2/2005 | Muller |
| 2005/0118959 | A1 | 6/2005 | Johan et al. |
| 2006/0063537 | A1 | 3/2006 | Lee et al. |
| 2006/0128372 | A1 | 6/2006 | Gazzola |
| 2006/0234638 | A1 | 10/2006 | Mueckenheim et al. |
| 2007/0037570 | A1 | 2/2007 | Donovan et al. |
| 2008/0077472 | A1 | 3/2008 | Dressler et al. |
| 2008/0077516 | A1 | 3/2008 | Dressler et al. |

FOREIGN PATENT DOCUMENTS

| | | |
|---|---|---|
| EP | 1523206 A2 | 4/2005 |
| JP | 10136436 A | 5/1998 |
| JP | 2001320320 A | 11/2001 |
| JP | 2002232344 A | 8/2002 |
| JP | 2003332975 A | 11/2003 |

OTHER PUBLICATIONS

Wang Shaowei et al, "Accurate High-speed propagation prediction method based on measurement", "2004 3rd International Conference in Computational Electromagnetics and Its Applications Proceedings", Nov. 1, 2004, pp. 449-452, Publisher: ICCEA, Published in: USA.

L. Falo, International Application No. PCT/US2007/077368 "International Search Report and Written Opinion", dated Apr. 24, 2008, Publisher: PCT, Published in: NL.

L. Falo, International Application No. PCT/US2007/077372 "International Search Report and Written Opinion", dated Apr. 23, 2008, Publisher: PCT.

L. Falo, International Application No. PCT/US2007/077373 "International Search Report and Written Opinion", dated Sep. 5, 2008, Publisher: PCT.

Dr. Carsten Ball, German Patent Application 11 2007 002 241.8 "Office Action ", dated May 5, 2012, Publisher: German Patent and Trademark Office, Published in: DE.

Dr. Carsten Ball, German Patent Application No. 11 2007 002 239.6 "Office Action", dated May 29, 2012, Publisher: German Patent and Trademark Office, Published in: DE.

FR Application No. 07 841 706.0 "Office Action" dated Aug. 11, 2009, Publisher: EPO, Published in: FR.

FR Application No. 07 841 707.8 "Office Action" dated Aug. 11, 2009 Publisher: EPO, Published in: FR.

Georgewill, Opiribo, U.S. Appl. No. 11/733,603 "Office Action" dated Apr. 15, 2010, Publisher: USPTO, Published in: US.

Sylvester, Hannah, GB Application No. GB0905229.1 "Office Action" dated Aug. 2, 2010, Publisher: UK IPO, Published in: GB.

Georgewill, Opiribo, U.S. Appl. No. 11/733,603 "Office Action" dated Jul. 27, 2010, Publisher: USPTO, Published in: US.

Sylvester, Hannah, GB Application No. GB0905021.2 "Office Action" dated Aug. 2, 2010, Publisher: UK IPO, Published in: GB.

Georgewill, Opiribo, U.S. Appl. No. 11/733,605 "Office Action" dated Oct. 26, 2010, Publisher: USPTO, Published in: US.

Hickery, Dan, GB Application No. GB0905022.0 "Office Action", dated Sep. 13, 2010, Publisher: UK IPO, Published in: GB.

Georgewill, Opiribo, U.S. Appl. No. 11/733,605 "Office Action", dated Feb. 3, 2011, Publisher: USPTO, Published in: US.

Georgewill, Opiribo, U.S. Appl. No. 11/733,603 "Office Action", dated Mar. 18, 2011, Publisher: USPTO, Published in: US.

Sylvester, Hannah, GB Application No. GB1102924.6 "Office Action", dated Jun. 15, 2011, Publisher: UK IPO, Published in: GB.

Sylvester, Hannah, GB Application No. GB1102925.3 "Office Action", dated Jun. 15, 2011, Publisher: UK IPO, Published in: GB.

Georgewill, Opiribo, U.S. Appl. No. 11/733,605 "Panel Decision" dated Jun. 1, 2011, Publisher: USPTO, Published in: US.

Georgewill, Opiribo, U.S. Appl. No. 11/733,603 "Office Action", dated Sep. 1, 2011, Publisher: USPTO, Published in: US.

Georgewill, Opiribo, U.S. Appl. No. 11/733,605 "Office Action" dated Aug. 18, 2011, Publisher: USPTO, Published in: US.

Falò, Luca, FR Application No. 07 841 702.9 "Office Action", dated Nov. 18, 2011, Publisher: EPO, Published in EP.

Falò, Luca, FR Application No. 07 841 706.0 "Office Action", dated Nov. 18, 2011, Publisher: EPO, Published in EP.

Falò, Luca, FR Application No. 07 841 707.8 "Office Action", dated Nov. 18, 2011, Publisher: EPO, Published in EP.

Georgewill, Opiribo, U.S. Appl. No. 11/733,605 "Office Action", dated Dec. 22, 2011, Publisher: USPTO, Published in: US.

Georgewill, Opiribo, U.S. Appl. No. 11/733,603 "Office Action", dated Jan. 19, 2012, Publisher: USPTO, Published in: US.

"Answer", dated Jun. 25, 2012 regarding U.S. Appl. No. 11/733,605, filed Apr. 10, 2007.

"Answer", dated Jun. 21, 2012 regarding U.S. Appl. No. 11/733,603, filed Apr. 10, 2007.

Falo, Luca, French Patent Application No. 07 841 707.8 "Office Action", dated Aug. 27, 2012, Publisher: EPO.

Co-Pending U.S. Appl. No. 11/733,603, "Final Office Action", dated Jan. 19, 2012, Publisher: USPTO, Published in: US.

Co-Pending U.S. Appl. No. 11/733,603 "Examiner's Answer", dated Jun. 21, 2012, Publisher: USPTO, Published in: US.

Co-Pending U.S. Appl. No. 11/733,603, "Patent Board Decision on Appeal", dated Mar. 23, 2015, Publisher: USPTO, Published in: US.

Co-Pending U.S. Appl. No. 11/733,603, "Notice of Panel Decision from Pre-Appeal Brief Review", dated Mar. 16, 2012, Publisher: USPTO, Published in: US.

Co-Pending U.S. Appl. No. 11/733,605, "Examiner's Answer", dated Jun. 25, 2012, Publisher: USPTO, Published in: US.

Co-Pending U.S. Appl. No. 11/733,605, "Final Office Action", dated Dec. 22, 2011, Publisher: USPTO, Published in: US.

Co-Pending U.S. Appl. No. 11/733,605, "Patent Board Decision on Appeal", dated Mar. 5, 2015, Publisher: USPTO, Published in: US.

Co-Pending U.S. Appl. No. 11/733,605, "Notice of Panel Decision from Pre-Appeal Brief Review", dated Mar. 19, 2012, Publisher: USPTO, Published in: US.

Related U.S. Appl. No. 11/733,605 "Non-Final Office Action", dated May 13, 2015, Publisher USPTO, Published in: US.

"Notice of Allowance" issued in U.S. Appl. No. 11/733,608, dated Feb. 18, 2016, Publisher: USPTO, Published in: US.

"Pre-Appeal Decision" issued in U.S. Appl. No. 11/733,608, dated Jan. 28, 2016, Publisher: USPTO, Published in: US.

"Office Action" issued in U.S. Appl. No. 11/733,608, dated Oct. 8, 2015, Publisher: USPTO, Published in: US.

(56) References Cited

OTHER PUBLICATIONS

"Office Action" issued in U.S. Appl. No. 11/733,608, dated May 14, 2015, Publisher: USPTO, Published in: US.
"Office Action" issued in U.S. Appl. No. 11/733,608, dated Dec. 24, 2014, Publisher: USPTO, Published in: US.
"Office Action" issued in U.S. Appl. No. 11/733,608, dated Oct. 8, 2014, Publisher: USPTO, Published in: US.
"Patent Board Decision" issued in U.S. Appl. No. 11/733,608, dated May 4, 2014, Publisher: USPTO, Published in: US.
"Examiner's Answer" issued in U.S. Appl. No. 11/733,608, dated Jan. 24, 2011, Publisher: USPTO, Published in: US.
"Pre Appeal Decision" issued in U.S. Appl. No. 11/733,608, dated Sep. 23, 2010, Publisher: USPTO, Published in: US.
"Office Action" issued in U.S. Appl. No. 11/733,608, dated May 27, 2010, Publisher: USPTO, Published in: US.
"Office Action" issued in U.S. Appl. No. 11/733,608, dated Feb. 3, 2010, Publisher: USPTO, Published in: US.
"Office Action" issued in U.S. Appl. No. 11/733,608, dated Sep. 24, 2009, Publisher: USPTO, Published in: US.

\* cited by examiner

100

EFFICIENT DEPLOYMENT OF MOBILE TEST UNITS TO GATHER LOCATION-DEPENDENT RADIO-FREQUENCY DATA

CROSS-REFERENCE TO RELATED APPLICATIONS

This application is related to U.S. patent application Ser. No. 11/733,608, filed Apr. 10, 2007, and No. 60/826,946, filed Sep. 26, 2006, both of which are incorporated herein by reference.

FIELD OF THE INVENTION

The present invention relates to wireless telecommunications in general, and, in particular, to a technique for efficiently deploying mobile test units to gather location-dependent radio-frequency data.

BACKGROUND

FIG. 1 depicts a diagram of the salient components of wireless telecommunications system 100 in accordance with the prior art. Wireless telecommunications system 100 comprises: wireless switching center 101, network operations center 102, base stations 103-1 and 103-2, GPS constellation 105, Internet 107, wireless terminal 111 and mobile test unit 112. Wireless telecommunications system 100 provides wireless telecommunications service to wireless terminal 111 throughout geographic region 120, in well-known fashion.

The effective operation of wireless telecommunications system 100 requires a plurality of radio-frequency analysis tools that are calibrated using empirical data from throughout geographic region 120. Whenever empirical data is needed for a tool, a drive-test plan is designed and implemented which directs mobile test unit 112 to various locations in geographic region 120. When the mobile test unit is at those locations, it makes a measurement of the signals of interest. The data is then delivered to network operations center 102 where it is used to calibrate the radio-frequency analysis tool.

SUMMARY OF THE INVENTION

The deployment of a mobile test unit to gather empirical radio-frequency data is expensive, and the present invention deploys mobile test units without some of the costs and disadvantages for doing so in the prior art.

In accordance with some embodiments of the present invention, a drive-test plan is implemented which is chosen to satisfy, at least partially, the requests for empirical data from a plurality of radio-frequency analysis tools. In some cases, this is more economically efficient than a separate drive-test plan to satisfy each request. The efficiency can arise not only when the deployment of the mobile test unit to one location results in data for a plurality of requests, but also when there is no location where data can be obtained for a plurality of requests. The latter is especially true when the initial and terminal costs for deploying a mobile test unit into the field are high.

In accordance with some embodiments of the present invention, one candidate drive-test plan is chosen for implementation over a second based on an economic cost-benefit analysis of both plans. This is in marked contrast to, for example, a selection of drive-test plans, or the design of a drive-test plan, based on a calibration-cost analysis, in which the data estimated to be the most effective to calibrate a radio-frequency tool is sought for a given cost or the least cost. Although a data-estimated-to-be-most-effective-to-calibrate-a-radio-frequency-tool vs. cost analysis is a species of cost-benefit analyses in general, it is not an economic cost-benefit analysis because a data-estimated-to-be-most-effective-to-calibrate-a-radio-frequency-tool vs. cost analysis has deficiencies that an economic cost-benefit analysis does not.

First, an economic cost-benefit analysis, in contrast to a data-estimated-to-be-most-effective-to-calibrate-a-radio-frequency-tool vs. cost analysis, ensures that the economic value resulting from the drive-test plan exceeds the cost of implementing the plan. This value can be determined with respect to the entity that is the ultimate consumer of the data, to the entity designing the drive-test plan, to the entity that is employed to gather the data, or to another entity.

Second, an economic cost-benefit analysis, in contrast to a data-estimated-to-be-most-effective-to-calibrate-a-radio-frequency-tool vs. cost analysis, provides a rational common-denominator for choosing a drive-test plan that seeks to satisfy, at least partially, the requests for empirical data from a plurality of radio-frequency analysis tools with different technical requirements for empirical data. This is essential to the implementation of an economically-efficient drive-test plan that seeks to satisfy, at least partially, the requests for empirical data that are discordant.

In accordance with some embodiments of the present invention, a variety of factors are used to determine the cost of a candidate drive-test plan. These factors include, but are not limited to, i. the cost of the mobile test unit(s) required for the plan; and ii. the cost of the time required to complete for the drive-test plan; and iii. the cost of the personnel required for the drive-test plan; and iv. the cost of lodging, meals, transportation, and logistical support for the personnel required for the drive-test plan; and v. the cost of a cost overrun as a function of the probability of the cost overrun (e.g., 5%, 10%, 25%, 50%, 100%, and 200%, etc.) for the drive-test plan given uncontrollable factors (e.g., weather, road closures, incorrect road maps, etc.); and vi. the cost of a completion delay as a function of the probability of the delay (e.g., 5%, 10%, 25%, 50%, 100%, and 200%, etc.) for the drive-test plan given uncontrollable factors (e.g., weather, road closures, incorrect road maps, etc.).

In accordance with some embodiments of the present invention, a variety of factors are used to determine the cost of a candidate drive-test plan. These factors include, but are not limited to, i. an estimate of the likelihood that the signal of interest can be isolated (e.g., decoded, etc.) from noise when a mobile test unit visits each location of interest as proposed in accordance with the plan; and ii. a characterization of the electromagnetic clutter at the frequency of the signal of interest for each location to be visited by a mobile test unit in accordance with the plan; and iii. a characterization of the terrain at each location to be visited by a mobile test unit in accordance with the plan; and iv. a characterization of the population density at each location to be visited by a mobile test unit in accordance with the plan; and v. a characterization of the proximity of at each location to be visited by a mobile test unit in accordance with the plan to a transportation facility (e.g., highway, railroad, rail station, airport, etc.); and vi. for each location to be to be visited in accordance with a plan, the existence in RF data database 413 of a previous measurement of the trait of interest of the signal of interest and the age of that previous measurement; and vii. the fact that in accordance with the drive-test plan a measurement of the trait of the signal will be made at location P and a location R. The purpose of this factor is to reduce the benefit of drive-test plans that comprise measurements at locations that are superfluous.

viii. the fact that in accordance with the drive-test plan a measurement of the trait of the signal will be made at location P but not made at a location S. The purpose of this factor is to increase the benefit of drive-test plans measurements that avoid gaps in coverage; and ix. the fact that in accordance with the drive-test plan a measurement of the trait of the signal will be made at location P but not made at a location Q, the existence in RF data database 413 of a previous measurement of a trait of a signal at location Q, the age of that previous measurement, and the distance between the location P and location Q.

Some embodiments of the present invention comprise: determining whether to make a measurement of an electromagnetic signal at a location P based, at least in part, on (i) an estimate of the likelihood that the signal can be isolated from noise at the location P.

DETAILED DESCRIPTION

For the purposes of this specification, the following terms and their inflected forms are defined as follows:

The term "location" is defined as a zero-dimensional point, a one-dimensional line, a two-dimensional area, or a three-dimensional volume.

Figure 1:
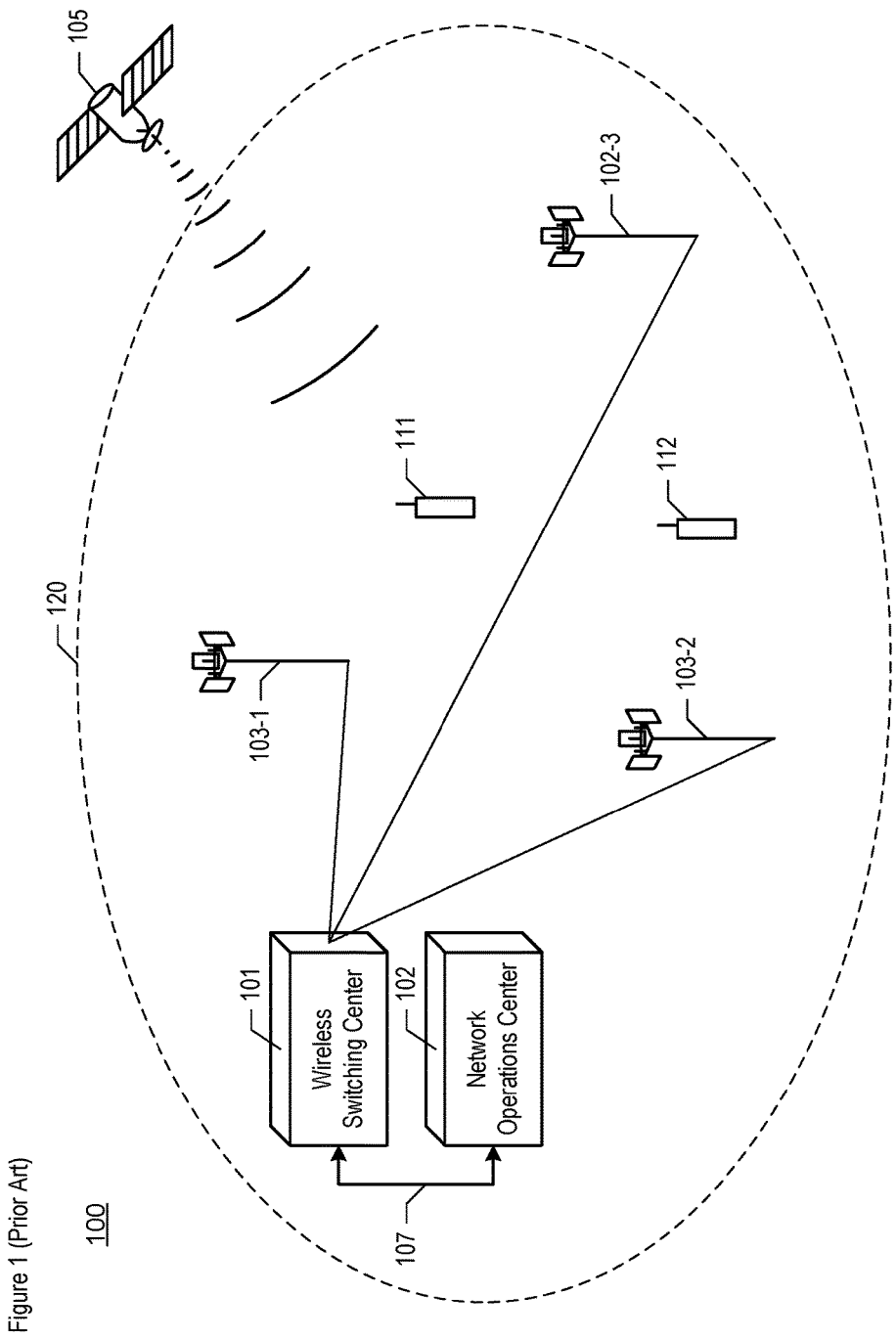
FIG. 1 depicts a diagram of the salient components of wireless telecommunications system 100 in accordance with the prior art.
Figure 2:
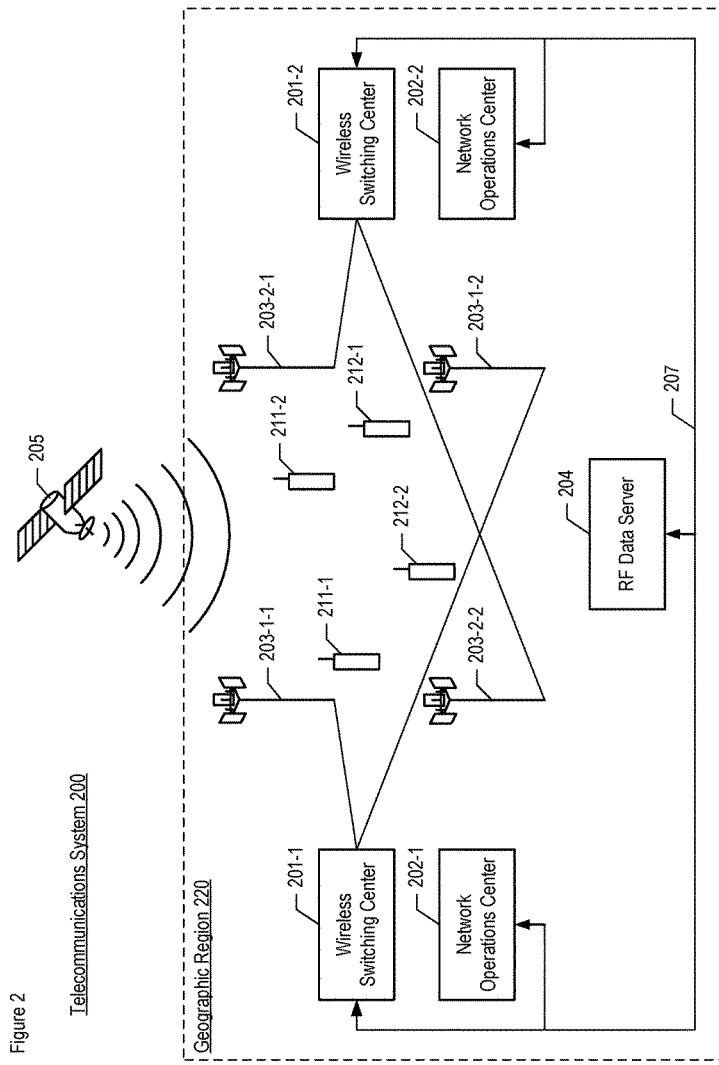
FIG. 2 depicts a diagram of the salient components of wireless telecommunications system 200 in accordance with the illustrative embodiment of the present invention.

Overview—FIG. 2 depicts a diagram of the salient components of wireless telecommunications system 200 in accordance with the illustrative embodiment of the present invention. Wireless telecommunications system 200 comprises: wireless switching centers 201-1 and 201-2, network operations center 202-1 and 202-2, base stations 203-1-1, 203-1-2, 203-2-1, and 203-2-2, RF data server 204, GPS constellation 205, Internet 207, wireless terminals 211-1 and 211-2, and mobile test units 212-1 and 212-2, which are interrelated as shown.

Wireless switching centers 201-1 and 201-2 each comprise the hardware, software, and personnel necessary to orchestrate the provisioning of wireless telecommunications service to wireless terminals 211-1 and 211-2 and mobile test units 212-1 and 212-2.

In accordance with the illustrative embodiment, wireless switching center 201-1, network operations center 202-1, and base stations 203-1-1 and 203-1-2 are owned and operated by a first legal entity.

In accordance with the illustrative embodiment, wireless switching center 201-1, network operations center 202-1, and base stations 203-1-1 and 203-1-2 provide service in accordance with the Universal Mobile Telecommunications System, which is commonly known as "UMTS." After reading this disclosure, however, it will be clear to those skilled in the art how to make and use alternative embodiments of the present invention in which the service is provided in accordance with any one or more air-interface standards (e.g., UMTS, Global System Mobile "GSM," CDMA-2000, IS-136 TDMA, IS-95 CDMA, 3G Wideband CDMA, 4G CDMA, IEEE 802.11 WiFi, 802.16 WiMax, Bluetooth, etc.) in any one or more frequency bands.

In accordance with the illustrative embodiment, wireless switching center 201-2, network operations center 202-2, and base stations 203-2-1 and 203-2-2 are owned and operated by a second legal entity that is in economic competition with the first legal entity. It will be clear to those skilled in the art, after reading this disclosure, how to make and use alternative embodiments of the present invention in which wireless switching centers 201-1 and 201-2, network operations center 202-1 and 202-2, and base stations 203-1-1, 203-1-2, 203-2-1, and 203-2-2 are:

i. owned, or ii. operated, or iii. owned and operated by:

i. one legal entity, or
ii. a combination of legal entities that are in economic cooperation, or
iii. a combination of legal entities that are in economic competition, or
iv. a combination of legal entities that are not in either economic cooperation or economic competition.

In accordance with the illustrative embodiment, wireless switching center 201-2, network operations center 202-2, and base stations 203-2-1 and 203-2-2 provide service in accordance with the Universal Mobile Telecommunications System. After reading this disclosure, however, it will be clear to those skilled in the art how to make and use alternative embodiments of the present invention in which wireless switching center 201-2, network operations center 202-2, and base stations 203-2-1 and 203-2-2 provide service in accordance with any one or more air-interface standards in any one or more frequency bands.

In accordance with the illustrative embodiment, telecommunications system 200 comprises two wireless switching centers, two network operations centers, and four base stations that are owned and operated by two legal entities. It will be clear to those skilled in the art, however, after reading this disclosure, how to make and use alternative embodiments of the present invention that comprise any number of wireless switching centers, any number of network operations centers, and any number of base stations. Furthermore, it will be clear to those skilled in the art, after reading this disclosure, how to make and use alternative embodiments of the present invention in which the wireless switching center(s), network operations center(s), and base station(s) are owned and/or operated by any number of legal entities, in any combination of economic cooperation, competition, or neither.

In accordance with the illustrative embodiment, wireless switching center 201-1 and wireless switching center 201-2 are identical and are described in detail below and in the accompanying figures. It will be clear to those skilled in the art, after reading this disclosure, how to make and use alternative embodiments of the present invention in which wireless switching center 201-1 and wireless switching center 201-2 are not identical.

Network operations center 202-1 comprises the hardware, software, and personnel to oversee and manage the operation of wireless switching center 201-1, base stations 202-1-1 and 202-1-2 and the provisioning of service to wireless terminals 211-1 and 211-2 and mobile test units 212-1 and 212-2. Analogously, network operations center 202-2 comprises the hardware, software, and personnel to oversee and manage the operation of wireless switching center 201-2, base stations 202-2-1 and 202-2-2 and the provisioning of service to wireless terminals 211-1 and 211-2 and mobile test units 212-1 and 212-2.

In accordance with the illustrative embodiment, network operations center 202-1 and network operations center 202-2 are identical and are described in detail below and in the accompanying figures. It will be clear to those skilled in the art, after reading this disclosure, how to make and use alternative embodiments of the present invention in which network operations center 201-1 and network operations center 201-2 are not identical.

Base stations 203-1-1, 203-1-2, 203-2-1, and 203-2-2 each comprises the hardware and software necessary to communicates with wireless terminals 211-1 and 211-2 and mobile test units 212-1 and 212-2 via radio in well-known fashion and with wireless switching centers 201-1 and 201-2 in well-known fashion. As is well known to those skilled in the art, base stations are also commonly referred to by a variety of alternative names such as access points, nodes, network interfaces, etc. Base stations 203-1-1 and 203-1-2 are associated with wireless switching center 201-1, and base stations 203-2-1 and 203-2-2 are associated with wireless switching center 201-2.

Base stations 203-1-1, 203-1-2, 203-2-1, and 203-2-2 are each capable of:
i. measuring all of the traits of all of the electromagnetic signals from mobile test units 212-1 and 212-2 that it can receive (as described in detail below) and of reporting the measurements to RF data server 204, and
iii. transmitting one or more signals to mobile test units 212-1 and 212-2 and reporting the transmission parameters of those signals to RF data server 204.

In accordance with the illustrative embodiment of the present invention, base stations 203-1-1, 203-1-2, 203-2-1, and 203-2-2 are terrestrial, immobile, and within geographic region 220. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 220.

In accordance with the illustrative embodiment, base stations 203-1-1, 203-1-2, 203-2-1, and 203-2-2 are identical. It will be clear to those skilled in the art, after reading this disclosure, how to make and use alternative embodiments of the present invention in which some or all of base stations 203-1-1, 203-1-2, 203-2-1, and 203-2-2 are not identical.

RF data server 204 comprises the hardware and software that orchestrates the acquisition of radio-frequency data that is used by network operations centers 202-1 and 202-2 as described below and in the accompanying figures. In accordance with the illustrative embodiment, RF data server 204 is owned and operated by a different entity than those which own and operate wireless switching centers 201-1 and 201-2, but it will be clear to those skilled in the art, after reading this disclosure, how to make and use alternative embodiments of the present invention in which RF data server 204 is owned and operated by the same entity that owns and operates a wireless switching center.

The illustrative embodiment comprises one RF data server, but it will be clear to those skilled in the art, after reading this disclosure, how to make and use alternative embodiments of the present invention in which there are any number of RF data servers.

GPS Constellation 205 is the collection of Global Positioning System satellites in Earth orbit that transmit signals, in well-known fashion, that enable wireless terminals 211-1 and 211-2 and mobile test units 212-1 and 212-2 to determine their location.

In accordance with the illustrative embodiment, wireless switching centers 201-1 and 201-2, network operations center 202-1 and 202-2, base stations 203-1-1, 203-1-2, 203-2-1, and 203-2-2, and RF data server 204, are connected via the Internet 207, but it will be clear to those skilled in the art, after reading this disclosure, how to make and use alternative embodiments of the present invention in which the entities communicate via one or more different networks (e.g., a local area network, a private network, the SS7 network, the Public Switched Telephone Network, etc.).

Wireless terminal 211-1 comprises the hardware and software necessary to be UMTS-compliant and to perform the processes described below and in the accompanying figures. For example and without limitation, wireless terminal 211-1 is capable of:

i. measuring all of the traits of all of the electromagnetic signals that it can receive (as described in detail below) and of reporting the measurements to location-based services tool 308-1 within network operations center 202-1 and ii. transmitting one or more signals and reporting the transmission parameters of those signals to location-based services tool 308-1 within network operations center 202-1 and, iii. determining its position in accordance with the Global Positioning System and reporting that position to location-based services tool 308-1 within network operations center 202-1.

Wireless terminal 211-1 is primarily associated with wireless switching center 201-1 and base stations 202-1 and 202-2, but can "roam" and use wireless switching center 201-2 and base stations 202-3 and 202-4. It will be clear to those skilled in the art how to make and use wireless terminal 211-1.

Wireless terminal 211-2 comprises the hardware and software necessary to be UMTS-compliant and to perform the processes described below and in the accompanying figures. For example and without limitation, wireless terminal 211-2 is capable of:

i. measuring all of the traits of all of the electromagnetic signals that it can receive (as described in detail below) and of reporting the measurements to location-based services tool 308-2 within network operations center 202-2 and, ii. transmitting one or more signals and reporting the transmission parameters of those signals to location-based services tool 308-2 within network operations center 202-2 and, iii. determining its position in accordance with the Global Positioning System and reporting that position to location-based services tool 308-2 within network operations center 202-2.

Wireless terminal 211-2 is primarily associated with wireless switching center 201-2 and base stations 202-3 and 202-4, but can "roam" and use wireless switching center 201-1 and base stations 202-1 and 202-1. It will be clear to those skilled in the art how to make and use wireless terminal 211-2.

Although the illustrative embodiment comprises two wireless terminals, it will be clear to those skilled in the art, after reading this disclosure, how to make and use alternative embodiments of the present invention that comprise any number of wireless terminals. Furthermore, it will be clear to those skilled in the art, after reading this disclosure, how to make and use alternative embodiments of the present invention in which any number of wireless terminals is primarily associated with wireless switching center 201-1 and any number of wireless terminals is primarily associated with wireless switching center 201-2.

Mobile test units 212-1 and 212-2 each comprises the hardware and software necessary to be UMTS-compliant and to perform the processes described below and in the accompanying figures. For example and without limitation, mobile test units 212-1 and 212-2 are each capable of:

i. measuring all of the traits of all of the electromagnetic signals that it can receive (as described in detail below) and of reporting the measurements to RF data server 204, and ii. transmitting one or more signals and reporting the transmission parameters of those signals to RF data server 204, and iii. determining its position in accordance with the Global Positioning System and reporting that position to RF data server 204, and iv. moving, under the direction of RF data server 204, to any location within geographic region 220 (albeit in some embodiments with the assistance of a human driver).

Mobile test unit 212-1 is primarily associated with wireless switching center 201-1 and base stations 202-1 and 202-2, but can "roam" and use wireless switching center 201-2 and base stations 202-3 and 202-4. Mobile test unit 212-2 is primarily associated with wireless switching center 201-2 and base stations 202-3 and 202-4, but can "roam" and use wireless switching center 201-1 and base stations 202-1 and 202-1.

Although the illustrative embodiment comprises two mobile test units, it will be clear to those skilled in the art, after reading this disclosure, how to make and use alternative embodiments of the present invention that comprise any number of mobile test units. Although mobile test units 212-1 and 212-2 are identical in the illustrative embodiment, it will be clear to those skilled in the art, after reading this disclosure, how to make and use alternative embodiments of the present invention in which some or all of the mobile test units are different. It will be clear to those skilled in the art how to make and use mobile test units 212-1 and 212-2.

Figure 8A:
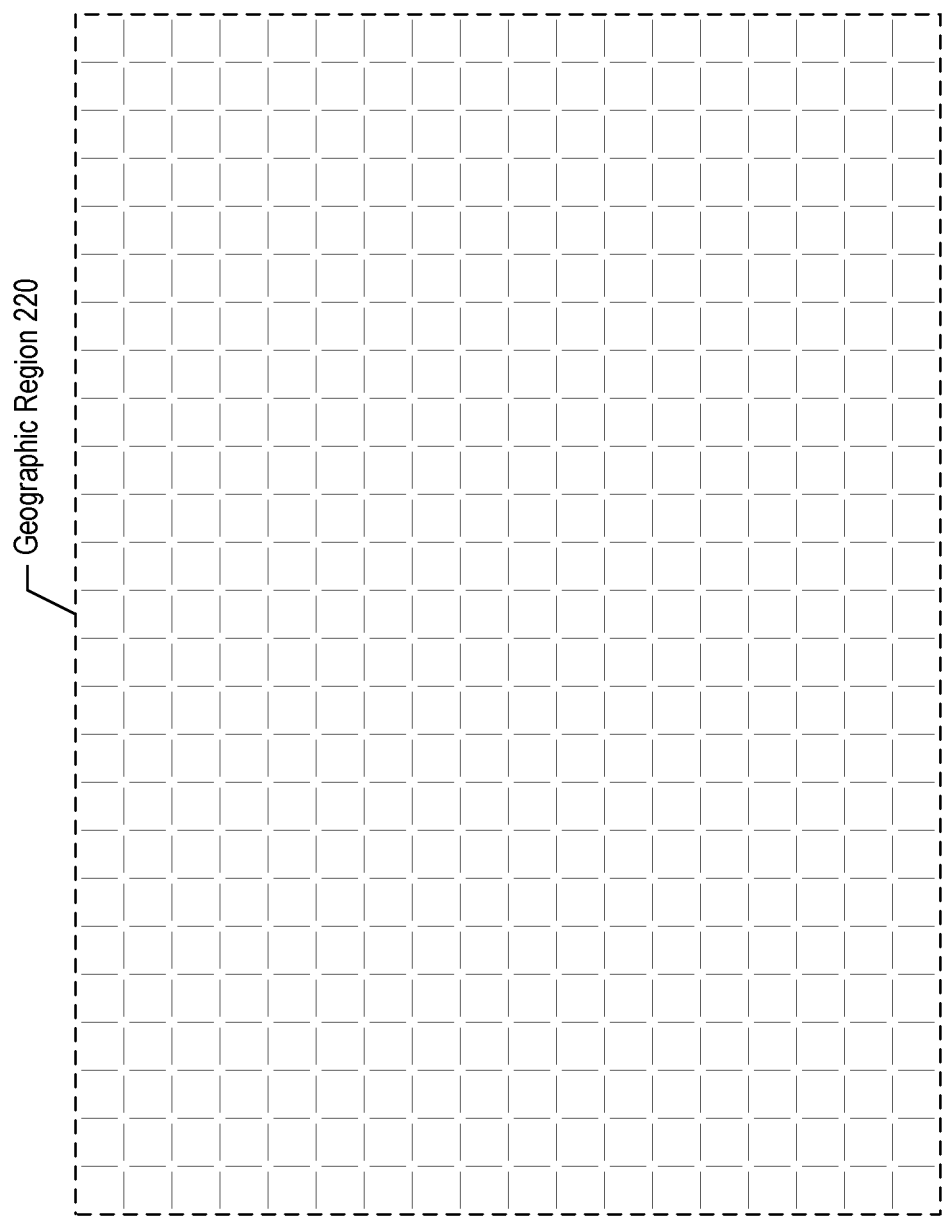
FIG. 8*a* depicts geographic region 220 partitioned into a 25×18 array of B=450 two-dimensional locations.

Geographic region 220 is partitioned into a 25×18 array of B=450 two-dimensional locations, as depicted in FIG. 8a. It will be clear to those skilled in the art, after reading this specification, how to make and use alternative embodiments of the present invention in which geographic region 220 is any size, any shape and is partitioned into any number of zero, one, two, or three-dimensional locations.

In accordance with the illustrative embodiment, wireless switching centers 201-1 and 201-2, network operations center 202-1 and 202-2, base stations 203-1-1, 203-1-2, 203-2-1, and 203-2-2, RF data server 204, wireless terminals 211-1 and 211-2, and mobile test units 212-1 and 212-2 are all within geographic region 220. It will be clear to those skilled in the art, after reading this disclosure, how to make and use alternative embodiments of the present invention in which some or all of those entities are outside of geographic region 220.

Figure 3:
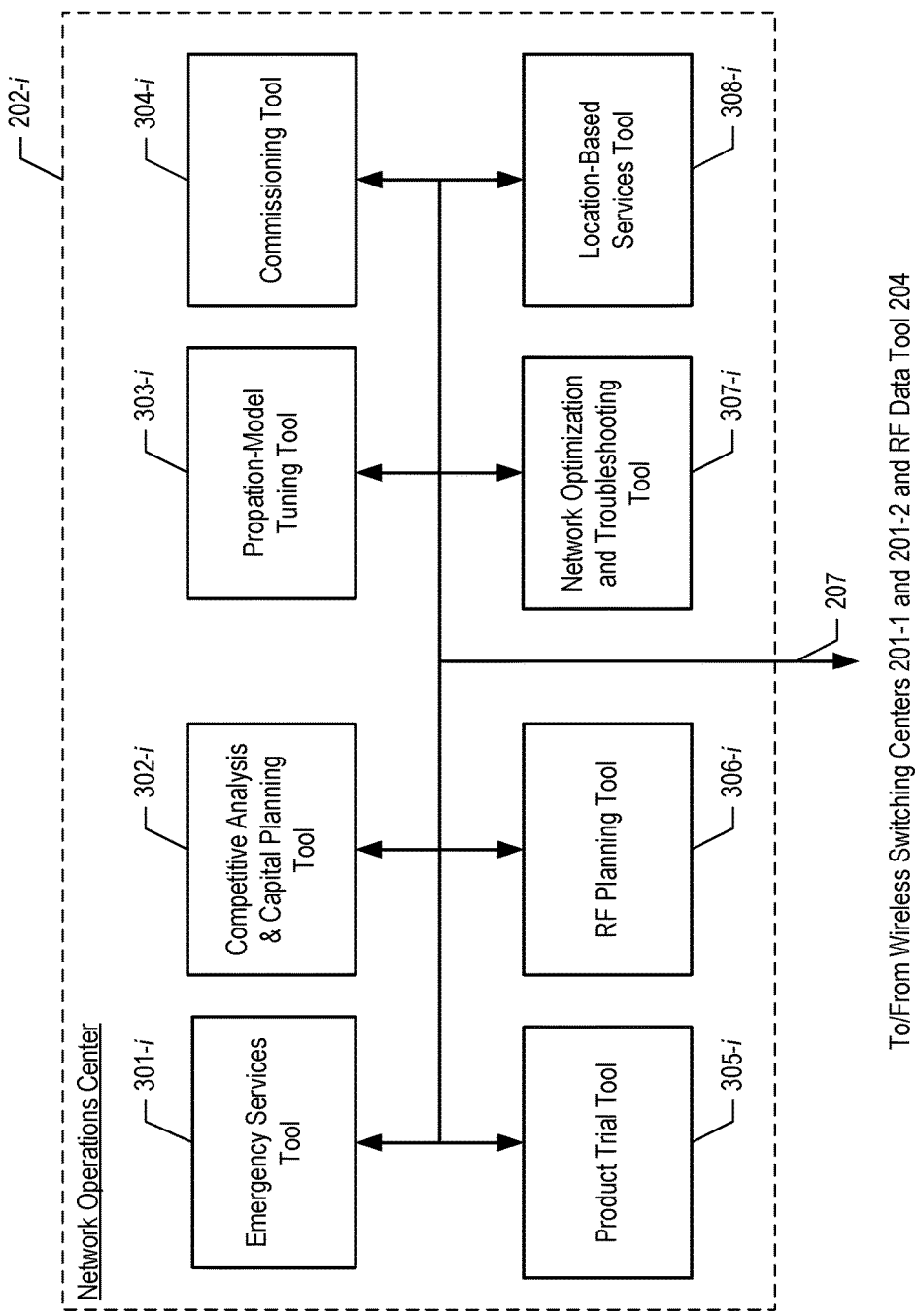
FIG. 3 depicts a block diagram of the salient components of network operations center 202-i in accordance with the illustrative embodiment, wherein i∈{0, 1}.

Network Operations Centers 202-1 and 202-2—FIG. 3 depicts a block diagram of the salient components of network operations center 202-i in accordance with the illustrative embodiment, wherein i∈{0, 1}. Network operations center 202-i comprises:

i. emergency services tool 301-i, and
ii. competitive analysis & capital planning tool 302-i, and
iii. propagation-model tuning tool 303-i, and
iv. commissioning tool 304-i, and
v. product trial tool 305-i, and
vi. RF planning tool 306-i, and
vii. network optimization and troubleshooting tool 307-i, and
viii. location-based services tool 308-i, which are each connected to wireless switching centers 201-1 and 201-2, and RF data server 204 via Internet 207.

Emergency services tool 301-i comprises the hardware, software and personnel responsible for demonstrating that location-based services tool 308-i is able to locate a wireless terminal within its the requirements (e.g., FCC OET-71 for E-911, etc.) for doing so. To accomplish this, emergency services tool 301-*i* needs empirical data, which it obtains from RF data server 204. In accordance with the illustrative embodiment, emergency services tool 301-*i* periodically or sporadically transmits a request to RF data server 204 for empirical data, which is described in detail below and in the accompanying figures.

Competitive analysis and capital planning tool 302-*i* comprises the hardware, software, and personnel responsible for gathering empirical data so that the owner/operator of the illustrative embodiment can perform competitive analysis and can plan capital improvements. To accomplish this, competitive analysis and capital planning tool 302-*i* periodically or sporadically transmits a request to RF data server 204 for empirical data, which is described in detail below and in the accompanying figures.

Propagation-model tuning tool 303-*i* comprises the hardware, software, and personnel responsible for maintaining and tuning the radio-frequency propagation model(s) used by the owner/operator of the illustrative embodiment for planning purposes. To accomplish this, propagation-model tuning tool 303-*i* periodically or sporadically transmits a request to RF data server 204 for empirical data, which is described in detail below and in the accompanying figures.

Commissioning tool 304-*i* comprises the hardware, software, and personnel responsible for gathering empirical data so that the owner/operator of the illustrative embodiment can bring ensure the proper operation of new base stations and newly sectorized base stations. To accomplish this, commissioning tool 304-*i* periodically or sporadically transmits a request to RF data server 204 for empirical data, which is described in detail below and in the accompanying figures.

Product trial tool 305-*i* comprises the hardware, software, and personnel responsible for gathering empirical data so that the owner/operator of the illustrative embodiment can test new products. To accomplish this, product trial tool 305-*i* periodically or sporadically transmits a request to RF data server 204 for empirical data, which is described in detail below and in the accompanying figures.

RF planning tool 306-*i* comprises the hardware, software, and personnel responsible for gathering empirical data so that the owner/operator of the illustrative embodiment can perform RF planning of its system. To accomplish this, RF planning tool 306-*i* periodically or sporadically transmits a request to RF data server 204 for empirical data, which is described in detail below and in the accompanying figures.

Network optimization and troubleshooting tool 307-*i* comprises the hardware, software, and personnel responsible for gathering empirical data so that the owner/operator of the illustrative embodiment can troubleshoot problems (e.g., dropped calls, etc.) and tune the operation of the system. To accomplish this, network optimization and troubleshooting tool 307-*i* periodically or sporadically transmits a request to RF data server 204 for empirical data, which is described in detail below and in the accompanying figures.

Location-based services tool 308-*i* comprises the hardware, software, and personnel responsible for gathering empirical data so that the owner/operator of the illustrative embodiment can locate wireless terminals 211-1 and 211-2 using RF fingerprinting as taught in U.S. patent application Ser. No. 11/419,645, filed 22 May 2006, entitled "Estimating the Location of a Wireless Terminal Based on Non-Uniform Probabilities of Movement", which is incorporated by reference. To accomplish this, location-based services tool 308-*i* periodically or sporadically transmits a request to RF data server 204 for empirical data, which is described in detail below and in the accompanying figures.

Figure 4:
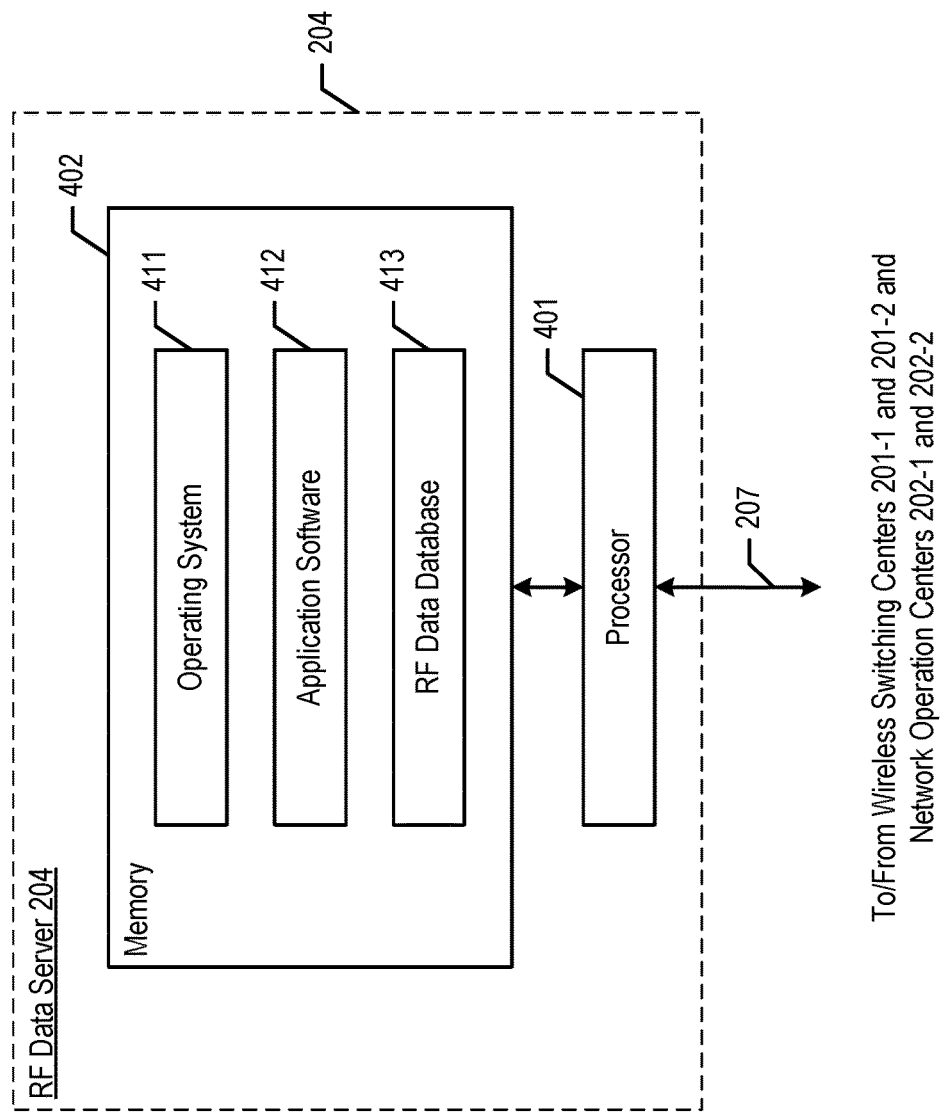
FIG. 4 depicts a block diagram of the salient components of RF data server 204 in accordance with the illustrative embodiment of the present invention.

RF data server 204—FIG. 4 depicts a block diagram of the salient components of RF data server 204 in accordance with the illustrative embodiment of the present invention. RF data server 204 comprises: processor 401 and memory 402, which are interconnected as shown.

Processor 401 is a general-purpose processor that is capable of executing operating system 411 and application software 412 in well-known fashion. It will be clear to those skilled in the art how to make and use processor 401.

Memory 402 is a non-volatile memory that stores:
i. operating system 411, and
ii. application software 412, and
iii. RF data database 413.

Operating system 411 performs the overhead functions, in well-known fashion, that enable RF data server 204 to execute application software 412.

Application software 412 comprises the software that cultivates (e.g., populates, repairs, grooms, etc.) RF data database 413, as described below and in the accompanying figures.

RF data database 413 is a database that maps each of a plurality of locations within geographic region 220 to one or more traits that are observable when a wireless terminal is at that location. In other words, RF data database 413 associates each of a plurality of locations with RF data measured by both a mobile test unit and a base station when the mobile test unit is at the location. RF data database 413 is described in detail below.

It will be clear to those skilled in the art how to make and use memory 302.

Figure 5:
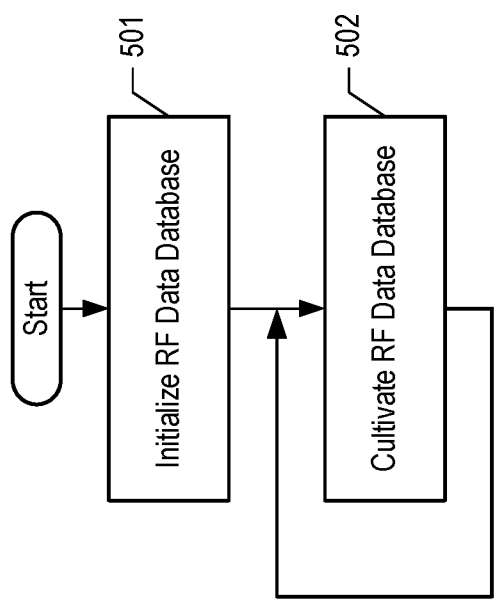
FIG. 5 depicts a flowchart of the salient processes performed in accordance with the illustrative embodiment of the present invention.

Operation of the Illustrative Embodiment—FIG. 5 depicts a flowchart of the salient processes performed in accordance with the illustrative embodiment of the present invention.

Figure 8B:
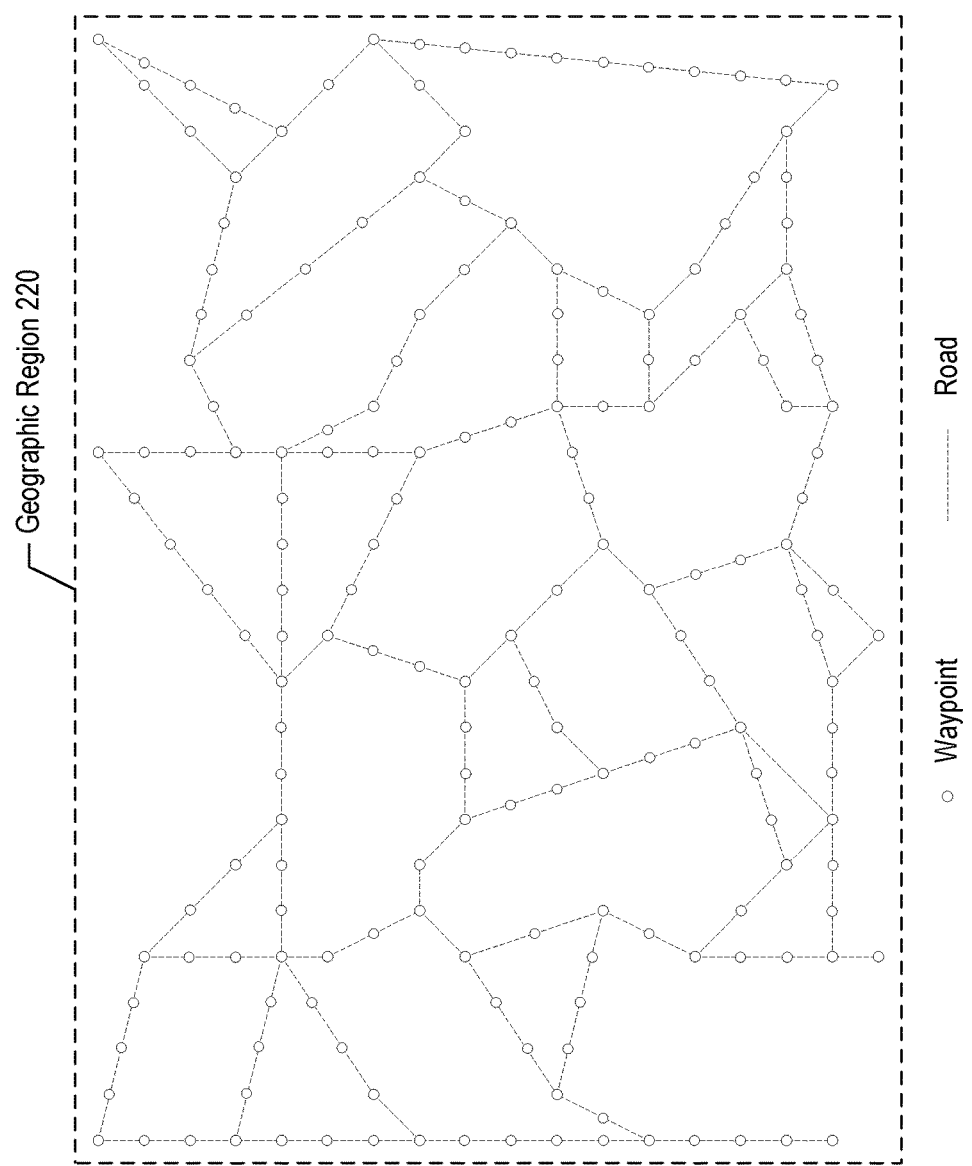
FIG. 8*b* depicts a detailed map of geographic location 220 that includes all road information and, in particular, a map of the waypoints to which a mobile test unit can be directed for a measurement by the mobile test unit and base stations 203-1-1, 203-1-2, 203-2-1, and 203-2-2.

In accordance with task 601, RF data database 413 is formatted and initialized by RF data server 204. In accordance with the illustrative embodiment, RF data database 413 is a data structure that stores for each of the 450 locations in geographic region 220:

i. an estimate of the likelihood that each signal that can be received within geographic region 220 can be isolated (e.g., decoded, etc.) from noise at that location, and
ii. a characterization of the electromagnetic clutter at that location at the frequency of each signal, and
iii. a characterization of the terrain at that location, and
iv. a characterization of the population density at that location, and
v. a characterization of the proximity of that location to each type of transportation facility (e.g., highway, road, railroad, rail station, airport, etc.), and
vi. the distance of location from each base station, and
vii. a detailed map for geographic location 220 that includes all road information and, in particular, a map of the waypoints to which a mobile test unit can be directed for a measurement by the mobile test unit and base stations 203-1-1, 203-1-2, 203-2-1, and 203-2-2. This is depicted in FIG. 8*b*.

It will be clear to those skilled in the art how to obtain this information.

At task 602, RF data database 413 is cultivated as described below and in the accompanying figures.

Figure 6:
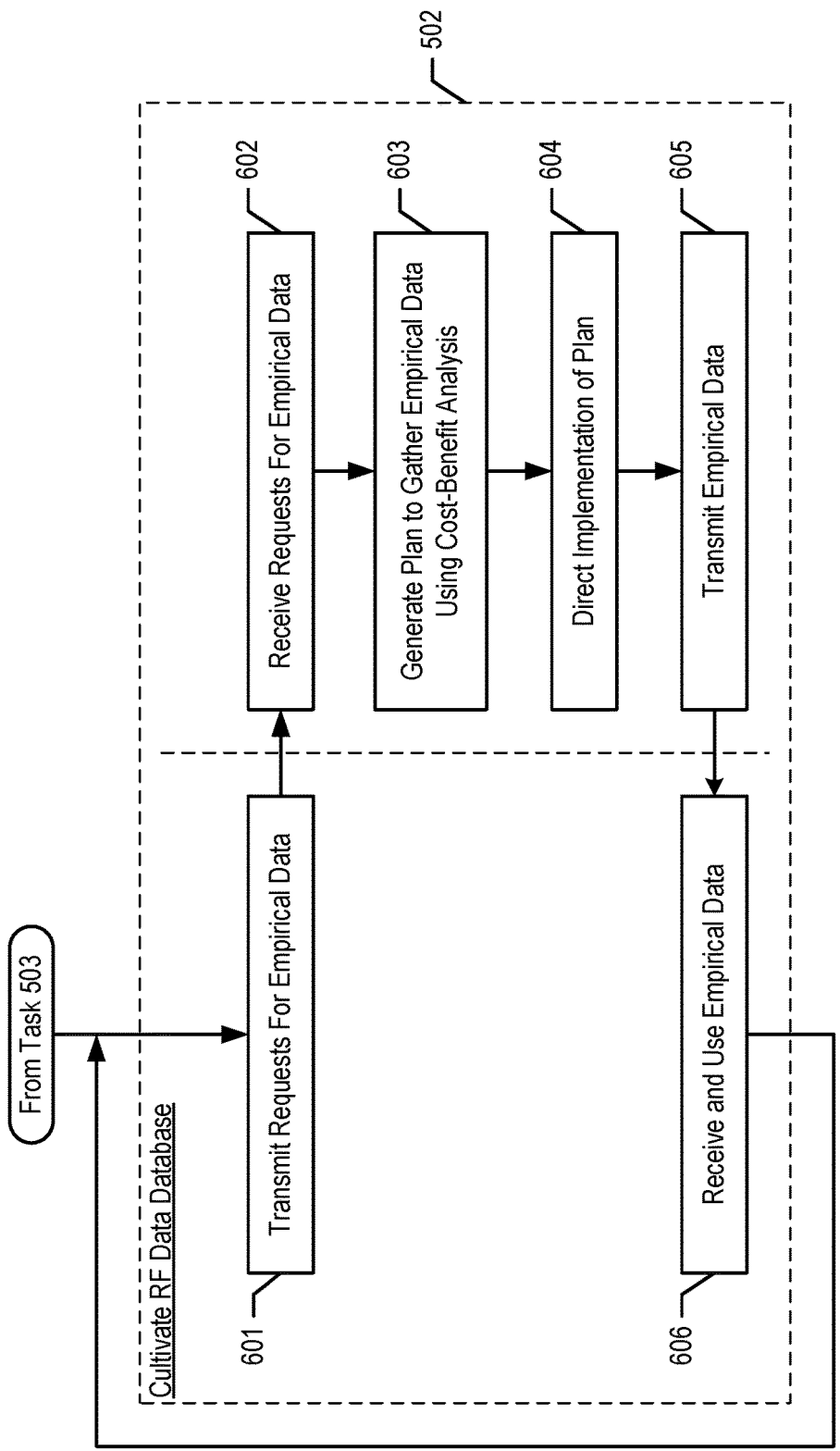
FIG. 6 depicts a flowchart of the salient tasks performed in accordance with task 502.

Cultivation of RF data database 413—FIG. 6 depicts a flowchart of the salient tasks performed in accordance with task 502.

At task 601,
i. emergency services tool 301-*i*, or ii. competitive analysis & capital planning tool 302-*i*, or iii. propagation-model tuning tool 303-*i*, or iv. commissioning tool 304-*i*, or v. product trial tool 305-*i*, or vi. RF planning tool 306-*i*, or vii. network optimization and troubleshooting tool 307-*i*, or viii. location-based services tool 308-*i*, or ix. any combination of i, ii, iii, iv, v, vi, vii, and viii periodically or sporadically transmits a request for empirical data to RF data server 204.

In accordance with the illustrative embodiment, each request comprises:

i. one or more technical requirements, and ii. an indication of the economic benefit of the requested data.

In accordance with the illustrative embodiment, the technical requirements of a request comprise:

i. an indication of the signals for which data is sought, or ii. an indication of the traits of those signals for which data is sought, or iii. an indication of the locations for which data is sought, or iv. an indication of any other constraints (e.g., timeframes for valid data—either retroactively or proactively or both, etc.), or v. any combination of i, ii, iii, and iv.

The indication of the locations for which data is sought can be specified as:

i. a list of specific locations (e.g., identified by location or latitude & longitude, etc.), or ii. a qualitative recitation of desired locations (e.g., "measure at 38% of the top 100 locations from which emergency calls are placed," etc.), or iii. a combination of i and ii.

In accordance with the illustrative embodiment, the benefit of the requested data comprises an indication of the economic benefit of the requested data. This indication can be specified as:

i. an unitemized benefit for the requested data in bulk (e.g., "$5000," "$3000 per month," "$10 per measurement," etc.), or ii. an itemized benefit for each specific location (e.g., "a measurement at location #234 is worth $9.00," "a measurement at location #523 is worth $1.75," etc.), or iii. an itemized benefit for groups of unspecified locations (e.g., "any 5-to-24 of the requested 1000 locations are worth $100," "any 25-to-100 of the requested 1000 locations are worth $500," "any 100-to-250 of the requested 1000 locations are worth $2000," etc.), or iv. any combination of i, ii, and iii.

At task 602, RF data server 204 receives the requests for empirical data transmitted by the tools in task 601 and accumulates them for processing once in task 603 each day. It will be clear to those skilled in the art, after reading this disclosure, how to make and use alternative embodiments of the present invention in which RF data server 204 processes them sporadically or periodically at another interval.

At task 603, RF data server 204 generates once each day a plan that attempts to economically satisfy both:

i. the requests that have been received since the last performance of task 603, and ii. the requests that were received before the last performance of task 630 that remain partially or wholly unfulfilled.

Task 603 is described in detail below and in the accompanying figures.

At task 604, RF data server 204 directs the implementation of the plan generated in task 603. In accordance with the illustrative embodiment, RF data server 204 generates driving directions for each mobile test unit used in the plan and transmits those directions to the driver of the respective mobile test unit. As each mobile test unit moves in accordance with the plan, the mobile test unit and base stations make measurements of the signals of interest:

i. periodically (e.g., once per second, etc.), plus ii. at every waypoint, plus iii. in every location through which the mobile test unit travels, plus iv. at the nearest point in the chain to the centroid of each location of interest.

RF data server 204 receives data from the mobile test unit and base stations 203-1-1, 203-1-2, 203-2-1, and 203-2-2 and stores it permanently in RF data database 413 for delivery to the tools and for use in designing and choosing other drive-test plans. If a request arrives at RF data server 204 for that data, RF data server 204 need not necessarily make another measurement of that data but can send the tool the data in RF database 413. Task 604 is described in detail below and in the accompanying figures.

At task 605, when the empirical data gathered in task 604 is transmitted to the appropriate tools by RF data server 204 when it becomes available and has been assimilated.

At task 606, the empirical data transmitted in task 606 is received by the respective tools that requested the data.

Figure 7:
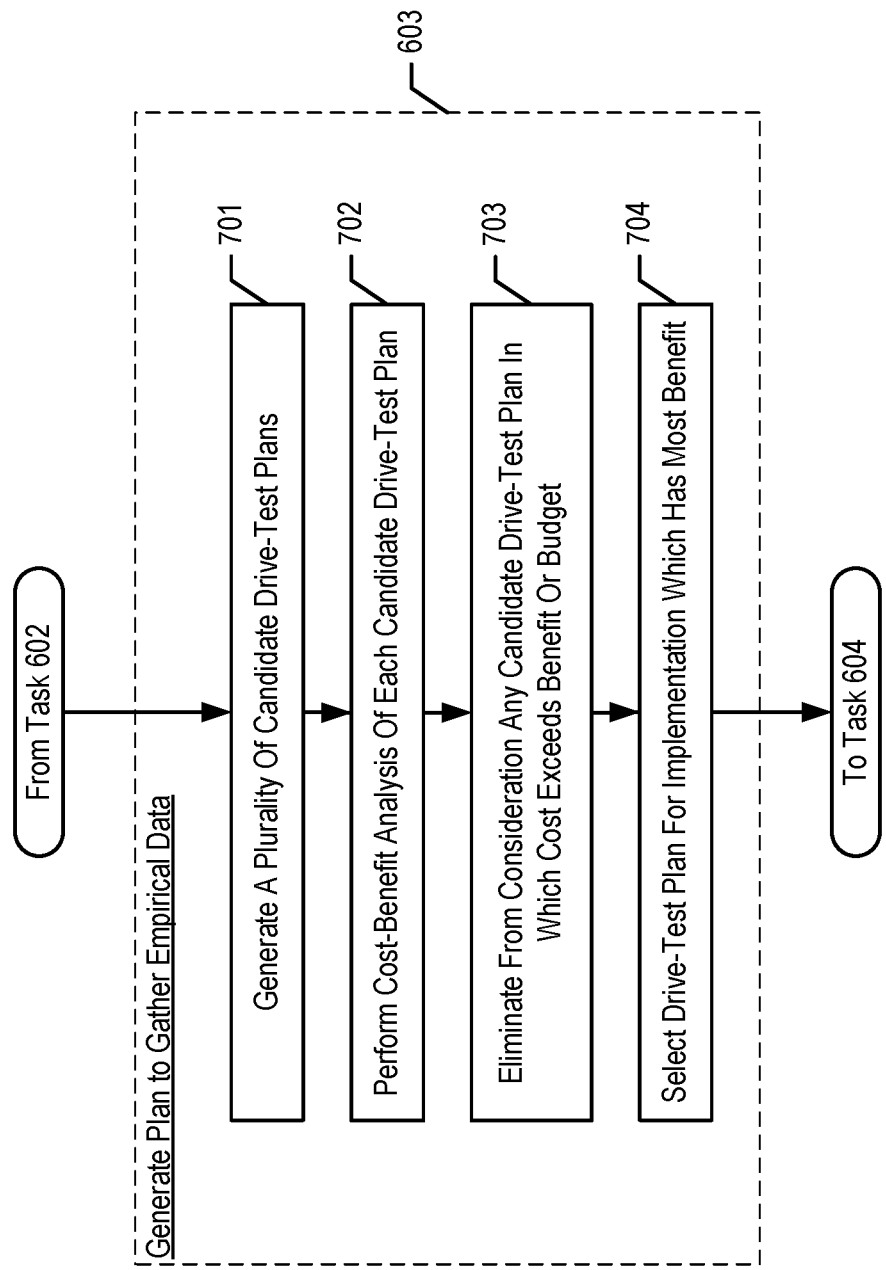
FIG. 7 depicts a flowchart of the salient tasks associated with task 603 in accordance with the illustrative embodiment of the present invention.

Generate Plan to Gather Data for RF Data Database 413—FIG. 7 depicts a flowchart of the salient tasks associated with task 603 in accordance with the illustrative embodiment of the present invention. An alternative technique for accomplishing task 603 is described in detail below and in the accompanying figures.

At task 701, RF data server 204 generates a plurality of candidate drive-test plans for gathering data for RF data database 413 that satisfy the cumulative technical requirements received in task 602. In accordance with the illustrative embodiment, each candidate drive-test plan comprises one or more chains. A chain is a series of links to be driven by one mobile test unit in one temporally-continuous session (e.g., a day, etc.). A chain is a drivable line of travel through a series of waypoints and has a preferred start time and a preferred completion time.

Figure 8C:
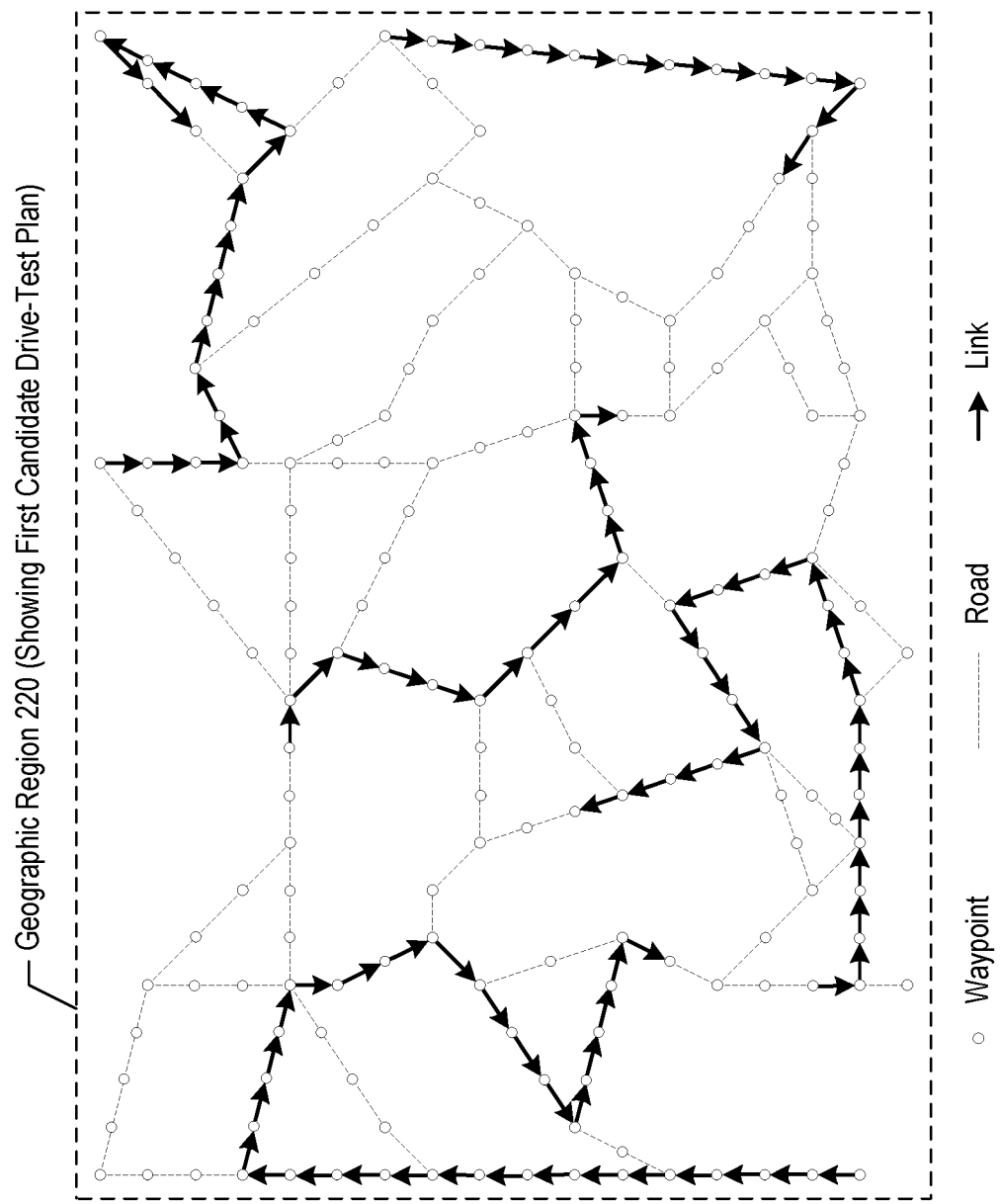
FIG. 8*c* depicts map of a first candidate drive-test plan in geographic region 220, which comprises five chains.

When the number of waypoints is large and the number of available mobile test units is large, the number of candidate drive-test plans cannot be exhaustively enumerated in a reasonable amount of time. In these cases, the illustrative embodiment uses heuristics, in well-known fashion, to generate a reasonable number of drive-test plans with diverse characteristics. For example, FIG. 8c depicts map of a first candidate drive-test plan in geographic region 220, which comprises five chains. The first candidate drive-test plan is summarized in Table 1 and proposes the use of two mobile test units and three days of driving.

TABLE 1

Summary of First Candidate Drive-test Plan

| Chain | Starting Waypoint | Mobile Test Unit | Preferred Start Time | Anticipated Stop Time |
|---|---|---|---|---|
| #1 | 41° 45' 39.00" N 86° 49' 28.44" W | #13 | Sep. 18, 2007 - 8:00 AM | Sep. 18, 2007 - 5:00 PM |
| #2 | 41° 46' 21.50" N 86° 32' 28.44" W | #13 | Sep. 19, 2007 - 8:00 AM | Sep. 19, 2007 - 5:00 PM |
| #3 | 41° 50' 30.30" N | #20 | Sep. 18, 2007 - | Sep. 18, 2007 - |

TABLE 1-continued

Summary of First Candidate Drive-test Plan

| Chain | Starting Waypoint | Mobile Test Unit | Preferred Start Time | Anticipated Stop Time |
|---|---|---|---|---|
| | 86° 06' 27.44" W | | 8:00 AM | 5:00 PM |
| #4 | 41° 52' 32.12" N | #20 | Sep. 19, 2007 - | Sep. 19, 2007 - |
| | 86° 23' 26.44" W | | 8:00 AM | 5:00 PM |
| #5 | 41° 55' 43.03" N | #13 | Sep. 20, 2007 - | Sep. 20, 2007 - |
| | 86° 44' 22.34" W | | 8:00 AM | 5:00 PM |

Figure 8D:
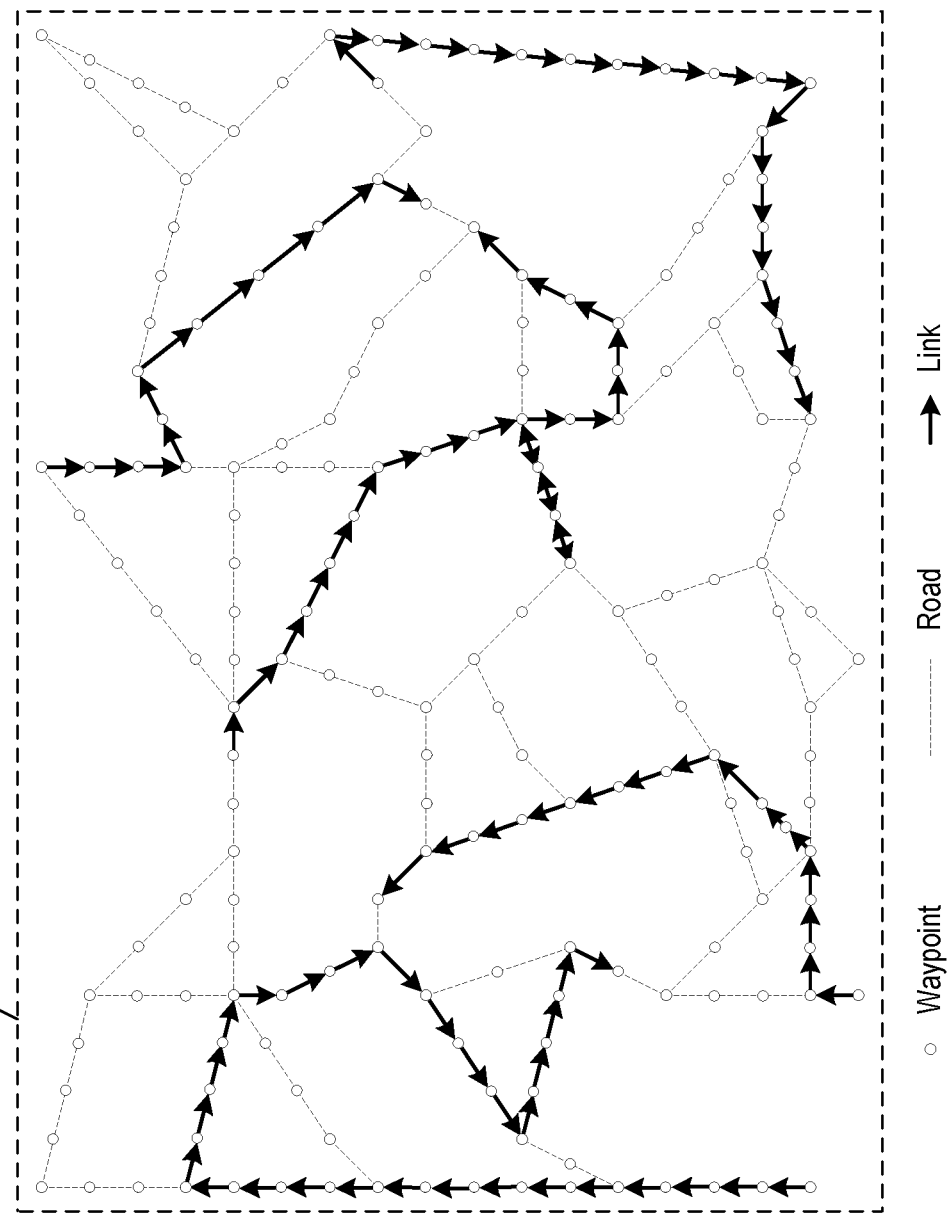
FIG. 8*d* depicts map of a second candidate drive-test plan in geographic region 220, which also comprises five chains.

FIG. 8d depicts map of a second candidate drive-test plan in geographic region 220, which also comprises five chains. The second candidate drive-test plan is summarized in Table 2 and proposes the use of three mobile test units and two days of driving.

TABLE 2

Summary of Second Candidate Drive-test Plan

| Chain | Starting Waypoint | Mobile Test Unit | Preferred Start Time | Anticipated Stop Time |
|---|---|---|---|---|
| #1 | 41° 45' 36.00" N | #13 | Sep. 18, 2007 - | Sep. 18, 2007 - |
| | 86° 49' 28.44" W | | 8:00 AM | 5:00 PM |
| #2 | 41° 46' 21.50" N | #13 | Sep. 19, 2007 - | Sep. 19, 2007 - |
| | 86° 22' 58.44" W | | 8:00 AM | 5:00 PM |
| #3 | 41° 56' 35.30" N | #20 | Sep. 18, 2007 - | Sep. 18, 2007 - |
| | 86° 06' 27.24" W | | 8:00 AM | 5:00 PM |
| #4 | 41° 52' 32.12" N | #20 | Sep. 19, 2007 - | Sep. 19, 2007 - |
| | 86° 25' 26.48" W | | 8:00 AM | 5:00 PM |
| #5 | 41° 56' 43.03" N | #7 | Sep. 19, 2007 - | Sep. 19, 2007 - |
| | 86° 44' 52.32" W | | 8:00 AM | 5:00 PM |

At task 702, RF data server 204 performs an economic cost-benefit analysis of each of the candidate drive-test plans generated in task 701. Task 702 is described in detail below and in the accompanying figures.

At task 703, RF data server 204 eliminates from further consideration any of the candidate drive-test plans in which, according to task 702, the cost exceeds or equals the benefit from implementing the plan or the budget for the plan. The purpose of task 703 is to ensure that if resources are used, they are used in a way that is profitable (i.e., the economic benefit of the information acquired exceeds the economic cost of acquiring it). It will be clear to those skilled in the art, after reading this disclosure, how to perform task 703.

At task 704, RF data server 204 selects for implementation the candidate drive-test plan not eliminated from consideration at task 703 that provides the greatest economic benefit. The purpose of task 704 is to ensure that the most beneficial candidate drive-test plan is implemented. In other words, task 704 ensures that the plan implemented in task 604 gathers data of greater benefit than any other plan proposed in task 701. It will be clear to those skilled in the art, after reading this disclosure, how to perform task 704.

Figure 9:
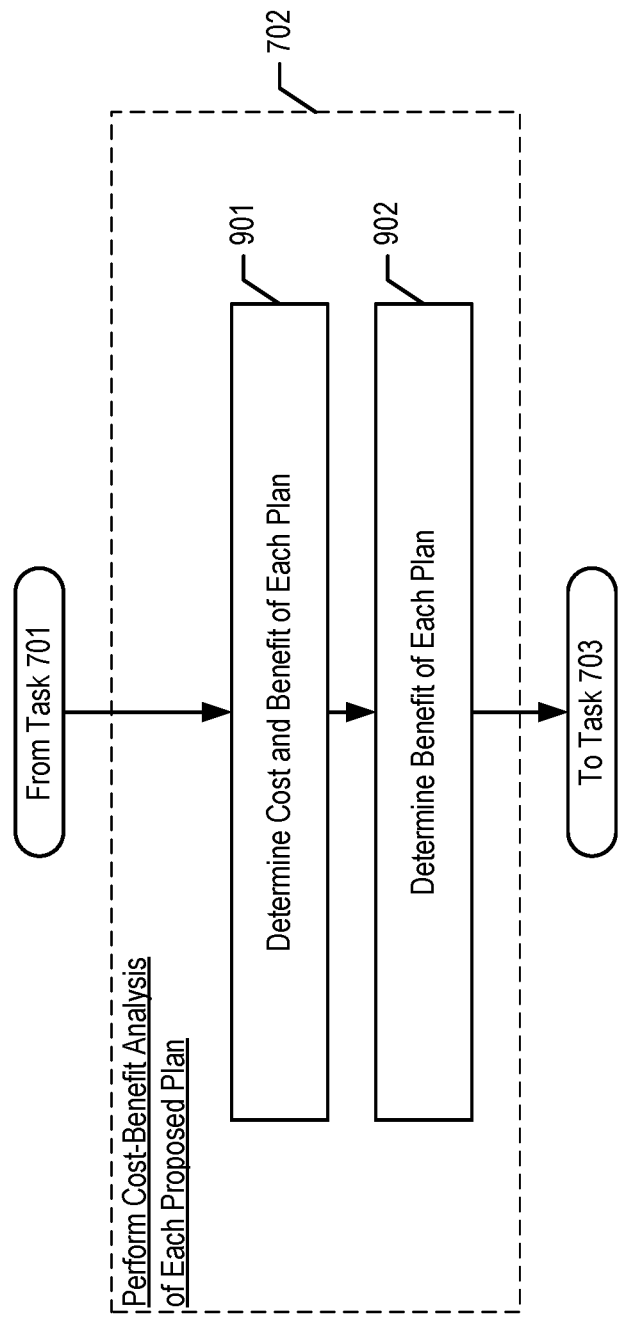
FIG. 9 depicts a flowchart of the salient tasks associated with performing a cost-benefit analysis of each candidate drive-test plan.

Perform Cost-Benefit Analysis of Each Candidate Drive-Test Plan—FIG. 9 depicts a flowchart of the salient tasks associated with performing a cost-benefit analysis of each candidate drive-test plan.

At task 901, RF data server 204 determines the comprehensive economic cost of implementing each candidate drive-test plan. In accordance with the illustrative embodiment, this cost is denominated in dollars. It will be clear to those skilled in the art, after reading this disclosure, how to make and use alternative embodiments of the present invention in which the cost is denominated in another currency or unit.

In accordance with the illustrative embodiment, the cost of implementing each candidate drive-test plan equals the sum of many factors including, but not limited to:

i. the cost of the mobile test unit(s) required for the plan. Other things being equal, the cost of a drive-test plan increases as the cost of the mobile test unit(s) increases. It will be clear to those skilled in the art, how to determine how the cost of a given drive-test plan depends on the cost of the mobile test unit(s) for any embodiment of the present invention (e.g., $100 plus $30 per mobile test unit per 24 hours, etc.).

ii. the cost of the time required to complete for the drive-test plan. Other things being equal, the cost of the drive-test plan increases as the total time required to complete increases. It will be clear to those skilled in the art, how to determine how the cost of a given drive-test plan depends on the time required to complete it for any embodiment of the present invention (e.g., $100 per 24 hours past the preferred completion time plus $10,000 per 24 hours past the maximum completion time, etc.).

iii. the cost of the personnel required for the drive-test plan. Other things being equal, the cost of the drive-test plan increases as the cost of the personnel increases. It will be clear to those skilled in the art, how to determine how the cost of a given drive-test plan depends on the required personnel for any embodiment of the present invention (e.g., $100 plus $300 per person per 24 hours, etc.).

iv. the cost of lodging, meals, transportation, and logistical support for the personnel required for the drive-test plan. Other things being equal, the cost of the drive-test plan increases as the cost of lodging, meals, transportation, and logistical support increases. It will be clear to those skilled in the art, how to determine how the cost of a given drive-test plan depends on the cost of lodging, meals, transportation, and logistical support for the personnel required to complete it for any embodiment of the present invention (e.g., $200 per person per 24 hours plus $1 per mile driven, etc.).

v. the cost of a cost overrun as a function of the probability of the cost overrun (e.g., 5%, 10%, 25%, 50%, 100%, and 200%, etc.) for the drive-test plan given uncontrollable factors (e.g., weather, road closures, incorrect road maps, etc.). Other things being equal, the cost of the drive-test plan increases as the various cost overruns and their associated probabilities increases. It will be clear to those skilled in the art, how to determine how the cost of a given drive-test plan depends on possible cost overruns and their associated probabilities for any embodiment of the present invention (e.g., the average of each cost overrun multiplied by its associated probability, etc.).

vi. the cost of a completion delay as a function of the probability of the delay (e.g., 5%, 10%, 25%, 50%, 100%, and 200%, etc.) for the drive-test plan given uncontrollable factors (e.g., weather, road closures, incorrect road maps, etc.). Other things being equal, the cost of the drive-test plan increases as the various delays and their associated probabilities increases. It will be clear to those skilled in the art, how to determine how the cost of a given drive-test plan depends on possible delays and their associated probabilities for any embodiment of the present invention (e.g., $500 for each 24 hours before the maximum completion time plus $10,00 for each 24 hours after the maximum completion time, etc.).

It will be clear to those skilled in the art, after reading this disclosure, how to make and use embodiments of the present invention that perform task 701.

At task 902, RF data server 204 determines the comprehensive economic cost of implementing each candidate drive-test plan. In accordance with the illustrative embodiment, this cost is denominated in dollars. It will be clear to those skilled in the art, after reading this disclosure, how to make and use alternative embodiments of the present invention in which the cost is denominated in another currency or unit.

In accordance with the illustrative embodiment, the benefit of implementing a candidate drive-test plan equals the sum of many factors, including, but not limited to:

i. an estimate of the likelihood that the signal of interest can be isolated (e.g., decoded, etc.) from noise when a mobile test unit visits each location of interest as proposed in accordance with the plan—Other things being equal, the benefit of a measurement of a signal of interest at a location of interest increases as the likelihood increases that the signal can be isolated, and the benefit of a plan increases with the number of locations of interest that are to be visited where it is likely that the signal of interest can be decoded. It will be clear to those skilled in the art, how to determine how the benefit of a given drive-test plan depends on an estimate of the likelihood that the signal can be isolated from noise at location P for any embodiment of the present invention (e.g., $1.00 multiplied by a measure of the likelihood that the signal can be decoded at location P, etc.).

ii. a characterization of the electromagnetic clutter at the frequency of the signal of interest for each location to be visited by a mobile test unit in accordance with the plan—Other things being equal, the benefit of a measurement of a signal at location P increases with the severity of the electromagnetic clutter in the vicinity of location P, and the benefit of a plan increases with the number of locations that are to be visited that exhibit severe clutter. It will be clear to those skilled in the art, how to determine how the benefit of a given drive-test plan depends on a characterization of the electromagnetic clutter at location P at the frequency of the signal for any embodiment of the present invention (e.g., $0.80 multiplied by a measure of the magnitude of the clutter at location P, etc.).

iii. a characterization of the terrain at each location to be visited by a mobile test unit in accordance with the plan—Other things being equal, the benefit of a measurement of a signal at location P increases with the variability—both natural and man-made—of the terrain in the vicinity of location P, and the benefit of a plan increases with the number of locations that are to be visited that exhibit variable terrain. It will be clear to those skilled in the art, how to determine how the benefit of a given drive-test plan depends on a characterization of the terrain at location P at the frequency of the signal for any embodiment of the present invention (e.g., $0.80 multiplied by a measure of the standard of deviation of the altitude at location P, etc.).

iv. a characterization of the population density at each location to be visited by a mobile test unit in accordance with the plan—Other things being equal, the benefit of a measurement of a signal at location P increases with the population density in the vicinity of location P, and the benefit of a plan increases with the number of locations to be visited that are high in population density. It will be clear to those skilled in the art, how to determine how the benefit of a given drive-test plan depends on a characterization of the population density at location P at the frequency of the signal for any embodiment of the present invention (e.g., $0.80 multiplied by a measure of the population density at location P, etc.).

v. a characterization of the proximity of at each location to be visited by a mobile test unit in accordance with the plan to a transportation facility (e.g., highway, railroad, rail station, airport, etc.)—Other things being equal, the benefit of a measurement of a signal at location P increases with the proximity of location P to a transportation facility, and the benefit of a plan increases with the number of locations to be visited that are near a transportation facility. It will be clear to those skilled in the art, how to determine how the benefit of a given drive-test plan depends on the proximity of location P to a transportation facility for any embodiment of the present invention (e.g., $1.00 divided by the square of the distance from location P to the nearest highway, airport, or train station, etc.).

vi. for each location to be to be visited in accordance with a plan, the existence in RF data database 413 of a previous measurement of the trait of interest of the signal of interest and the age of that previous measurement—Other things being equal, the benefit of a measurement of a signal at location P decreases with the existence in RF data database 413 of a previous measurement of the trait of the signal but increases with the age of that measurement. Furthermore, the benefit of a plan decreases with the number of locations to be visited for which previous measurements exist in RF data database 413. It will be clear to those skilled in the art, how to determine how the benefit of a given drive-test plan depends on the existence and age of a previous measurement at location P for any embodiment of the present invention (e.g., $1.00 divided by $e^x$, wherein x is a measure of the age of the previous measurement at location P, etc.).

vii. the fact that in accordance with the drive-test plan a measurement of the trait of the signal will be made at location P and a location R. The purpose of this factor is to reduce the benefit of drive-test plans that comprise measurements at locations that are superfluous. Other things being equal, the benefit of a drive-test plan that proposes superfluous measurements decreases with the number of superfluous locations. It will be clear to those skilled in the art, after reading this disclosure, how to determine when the measurement of two locations is superfluous. Furthermore, it will be clear to those skilled in the art, how to determine how the benefit of a given drive-test plan depends on the avoidance of superfluous measurements for any embodiment of the present invention (e.g., −$0.20 when the drive-test plan specifies a measurement at both location P and at location R; otherwise $0.00, etc.).

viii. the fact that in accordance with the drive-test plan a measurement of the trait of the signal will be made at location P but not made at a location S. The purpose of this factor is to increase the benefit of drive-test plans measurements that avoid gaps in coverage. Other things being equal, the benefit of a drive-test plan increases with number of gaps in coverage that are avoided. It will be clear to those skilled in the art, after reading this disclosure, how to determine when the measurement of two locations is superfluous. Furthermore, it will be clear to those skilled in the art, how to determine how the benefit of a given drive-test plan depends on the avoidance of superfluous measurements for any embodiment of the present invention (e.g., −$0.20 when the drive-test plan specifies a measurement at both location P and at location S; otherwise $0.00, etc.).

ix. the fact that in accordance with the drive-test plan a measurement of the trait of the signal will be made at location P but not made at a location Q, the existence in RF data database 413 of a previous measurement of a trait of a signal at location Q, the age of that previous measurement, and the distance between the location P and location Q—Other things being equal, the benefit of a measurement at location P increases with the distance between location P and location Q and also increases with the age of the previous measurement (e.g., $1.00 divided by $e^x$ multiplied by the distance between location P and location Q, wherein x is a measure of the age of the previous measurement at location P, etc.).

It will be clear to those skilled in the art, after reading this disclosure, how to make and use embodiments of the present invention that perform task 702.

Figure 10:
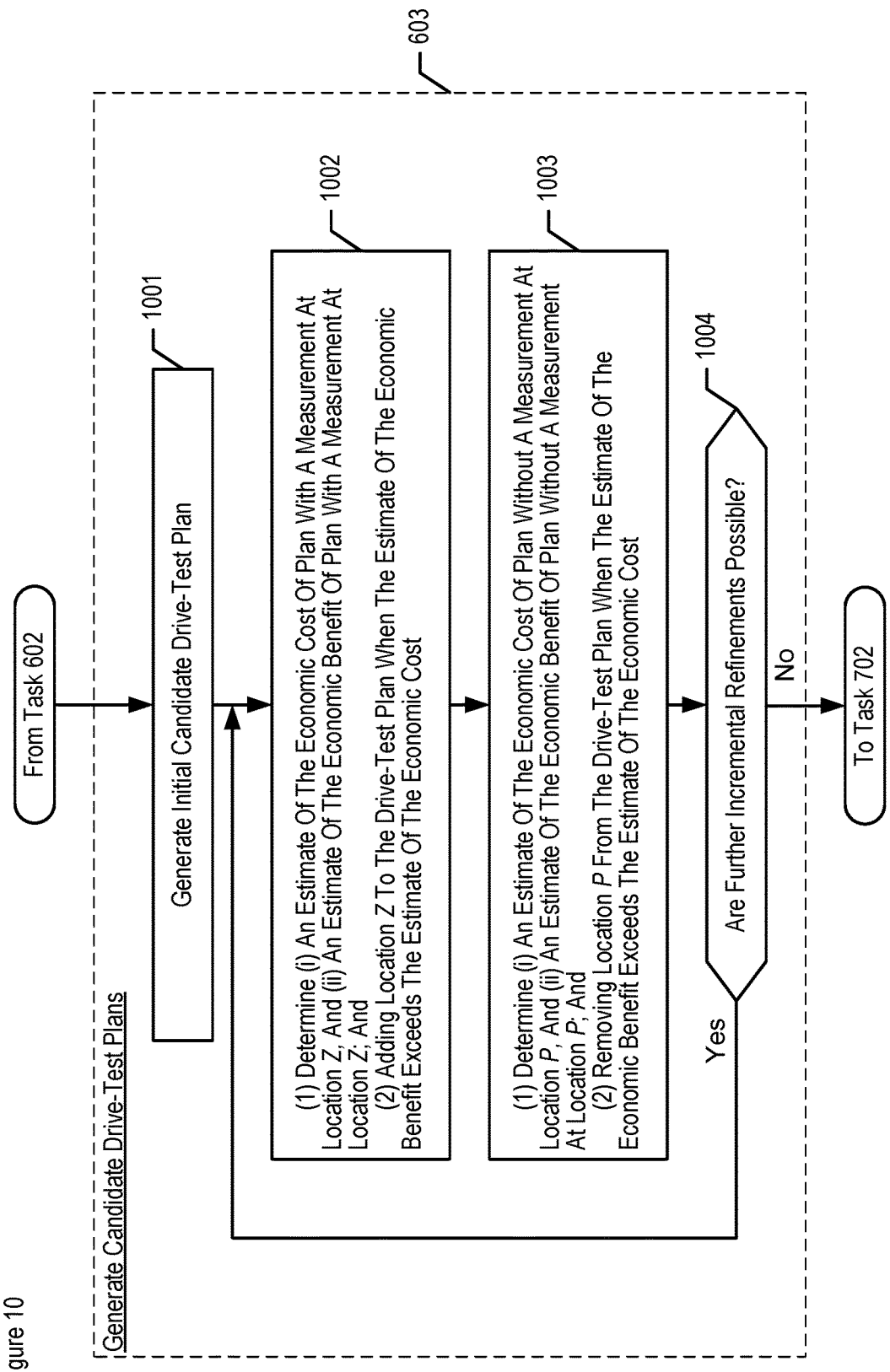
FIG. 10 depicts a flowchart of the salient tasks associated with task 603 in accordance with an alternative embodiment of the present invention.

Iterative and Incremental Drive-Test Plan Generation—FIG. 10 depicts a flowchart of the salient tasks associated with task 603 in accordance with an alternative embodiment of the present invention. Task 603 as described in FIG. 7 compares and evaluates contrasting and fully-formed candidate drive-test plans using a cost-benefit analysis. In contrast, task 603 as described in FIG. 10 uses a cost-benefit analysis to iteratively and incrementally improve the cost-benefit ratio of one initial drive-test plan that has an economic benefit that exceeds its economic cost.

At task 1001, RF data server 204 generates an initial drive-test plan using heuristics and in the same manner any one candidate drive-test plan is generated in task 701. The initial drive-test plan is summarized in Table 3 and proposes making measurements at a non-empty set of L locations.

TABLE 1

Summary of Initial Drive-test Plan

| Chain | Starting Waypoint | Mobile Test Unit | Preferred Start Time | Anticipated Stop Time |
|---|---|---|---|---|
| #1 | 41° 45' 39.00" N 86° 49' 28.44" W | #13 | Sep. 18, 2007 - 8:00 AM | Sep. 18, 2007 - 5:00 PM |
| #2 | 41° 46' 21.50" N 86° 32' 28.44" W | #13 | Sep. 19, 2007 - 8:00 AM | Sep. 19, 2007 - 5:00 PM |
| #3 | 41° 50' 30.30" N 86° 06' 27.44" W | #7 | Sep. 18, 2007 - 8:00 AM | Sep. 18, 2007 - 5:00 PM |
| #4 | 41° 52' 32.12" N 86° 23' 26.44" W | #13 | Sep. 19, 2007 - 8:00 AM | Sep. 19, 2007 - 5:00 PM |
| #5 | 41° 55' 43.03" N 86° 44' 22.34" W | #20 | Sep. 20, 2007 - 8:00 AM | Sep. 20, 2007 - 5:00 PM |

Figure 11A:
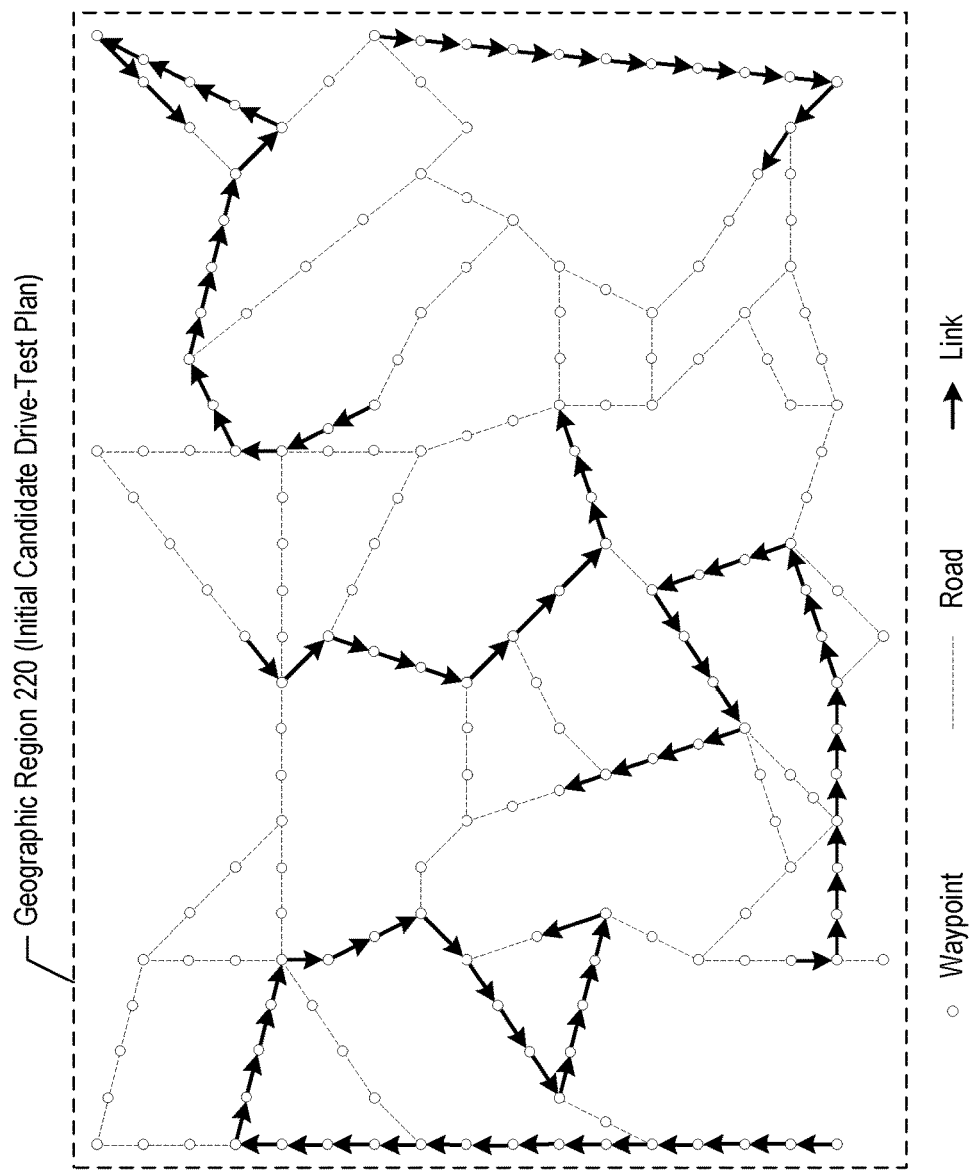
FIG. 11*a* depicts an initial drive-test plan.

The initial drive-test plan is depicted in FIG. 11*a*.

At task 1002, RF data server 204 determines:
i. an estimate of the economic cost of the drive-test plan with an additional measurement at a location Z, wherein $Z \notin L$, and
ii. an estimate of the economic benefit of the drive-test plan with the additional measurement at a location Z.

Figure 11B:
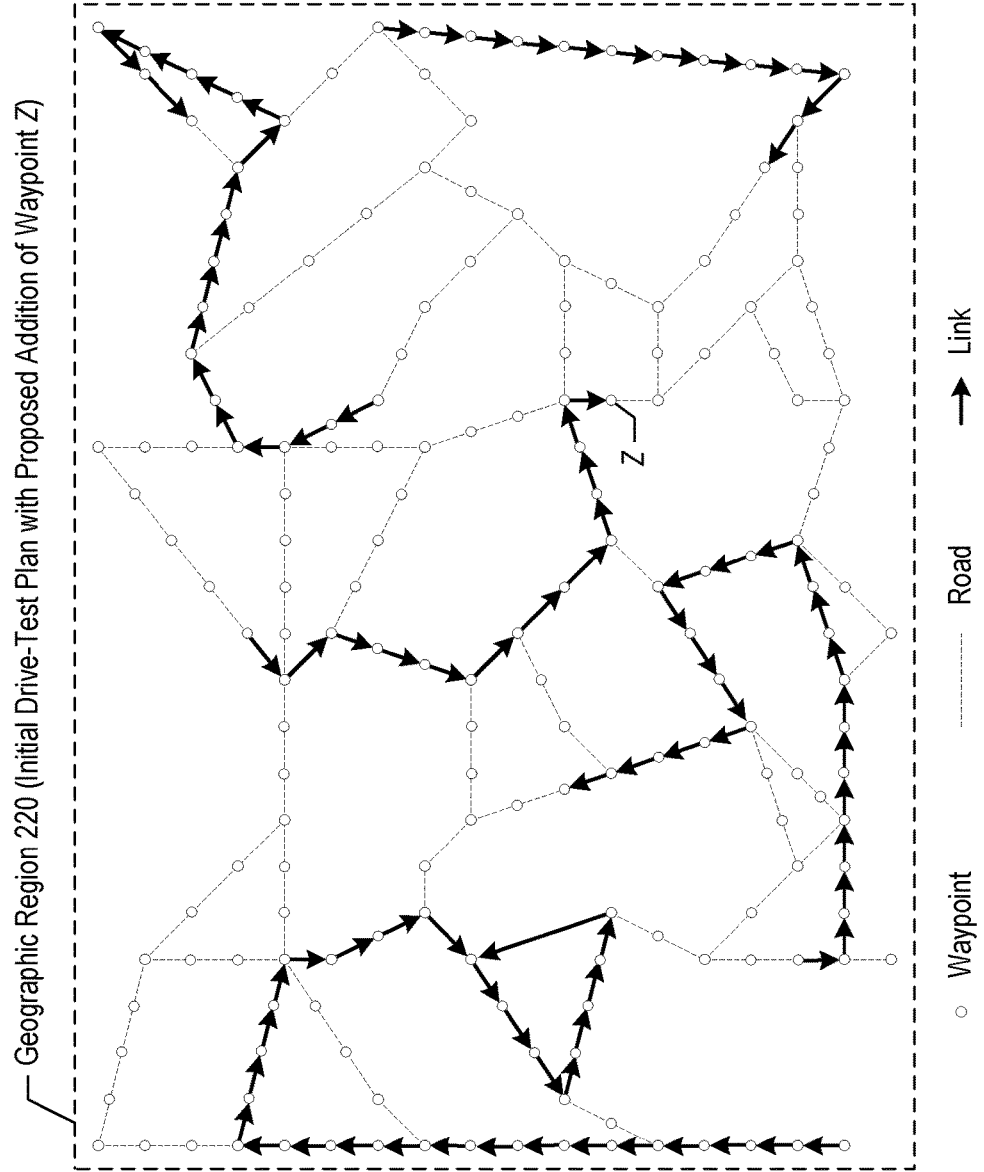
FIG. 11*b* depicts the initial drive-test plan with the proposed addition of location Z.

As part of considering the addition of location Z to the drive-test plan, RF data server 204 also considers changing the assignment of waypoints to chains, the number of chains, the assignment of mobile test units to chains, the number of mobile test units, and the preferred start times and anticipated stop times for each chain. The drive-test plan with the proposed addition of location Z is depicted in FIG. 11*b*.

The factors used to estimate the estimate of the economic cost of the drive-test plan with an additional measurement at a location Z and the estimate of the economic cost of the drive-test plan with an additional measurement at a location Z are the same factors as described in detail above and in the accompanying figures. When and only when the estimate of the economic cost of the drive-test plan with an additional measurement at a location Z exceeds estimate of the economic cost of the drive-test plan with an additional measurement at a location Z, RF data server 204 adds location Z to the drive-test plan.

Task 1002 is performed repeatedly for all locations $Z \notin L$ until no further improvement can be made in the cost-benefit analysis.

At task 1003, RF data server 204 determines:
i. an estimate of the economic cost of the drive-test plan without a measurement at a location P, wherein $P \in L$, and
ii. an estimate of the economic benefit of the drive-test plan without a measurement at a location P.

Figure 11C:
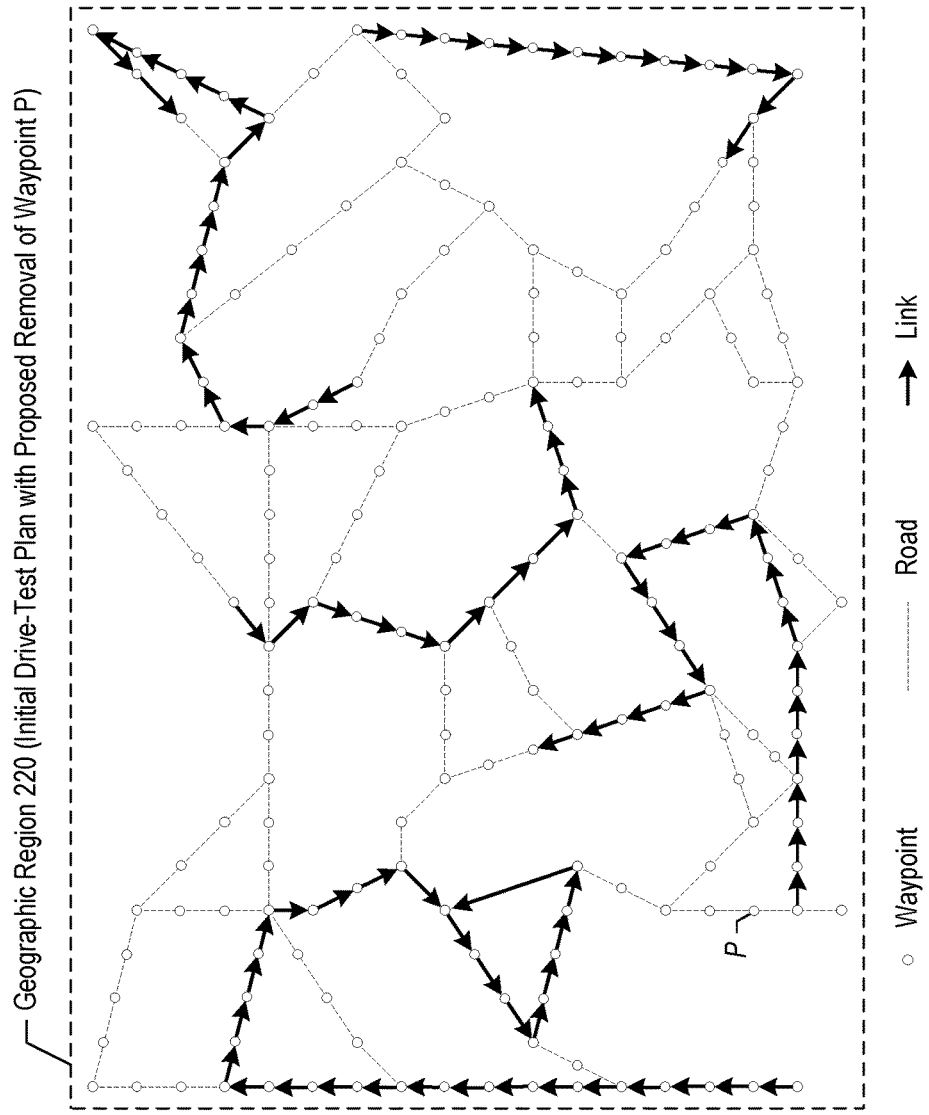
FIG. 11*c* depicts the initial drive-test plan with the proposed removal of location P.

As part of considering the removal of location P from the drive-test plan, RF data server 204 also considers changing the assignment of waypoints to chains, the number of chains, the assignment of mobile test units to chains, the number of mobile test units, and the preferred start times and anticipated stop times for each chain. The drive-test plan with the proposed removal of location P is depicted in FIG. 11*c*.

The factors used to estimate the estimate of the economic cost of the drive-test plan without a measurement at a location P and the estimate of the economic cost of the drive-test plan without a measurement at a location P are the same factors as described in detail above and in the accompanying figures. When and only when estimate the estimate of the economic cost of the drive-test plan without a measurement at a location P and the estimate of the economic cost of the drive-test plan without a measurement at a location, RF data server 204 removes location P from the drive-test plan.

Task 1003 is performed repeatedly for all locations $P \in L$ until no further improvement can be made in the cost-benefit analysis.

At task 1004, RF data server 204 determines whether further improvements are warranted or possible. When:
i. the performance of tasks 1002 and 1003 in succession do not change the drive-test plan, then control passes to task 702 (even though RF data server 204's attempt at optimizing the cost-benefit of the plan might be trapped in a local maxima), or
ii. there is a cost-benefit goal for the drive-test plan and the drive-test plan achieves that goal, then control progresses to task 702; otherwise, control returns to task 1002.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:
1. A method comprising:
receiving, by a data server, requests for empirical data;

generating a drive-test plan, by the data server, based on determining whether to make a measurement of an electromagnetic signal at a location P within a geographic region and to which a mobile test unit can be directed, based, at least in part, on
  (i) at least one of the requests for empirical data,
  (ii) a map of waypoints to which the mobile test unit can be directed for a measurement within the geographic region, and
  (iii) an estimate of the likelihood that the signal can be isolated from noise at the location P;
making measurements of electromagnetic signals, by the mobile test unit, in accordance with the drive-test plan generated by the data server;
receiving, by the data server, the measurements made by the mobile test unit; and
transmitting, by the data server, empirical data that is based on the measurements received.

2. The method of claim 1 wherein determining whether to make the measurement of the signal at the location P is also based, at least in part, on a characterization of the electromagnetic clutter at the location P at the frequency of the signal.

3. The method of claim 1 wherein determining whether to make the measurement of the signal at the location P is also based, at least in part, on a characterization of the terrain at the location P.

4. The method of claim 1 wherein determining whether to make the measurement of the signal at the location P is also based, at least in part, on a characterization of the population density at the location P.

5. The method of claim 1 wherein determining whether to make the measurement of the signal at the location P is also based, at least in part, on whether a previous measurement of the electromagnetic signal has been made at the location P.

6. The method of claim 5 wherein determining whether to make the measurement of the signal at the location P is also based, at least in part, on the age of the previous measurement of the electromagnetic signal at the location P.

7. The method of claim 1 wherein determining whether to make the measurement of the signal at the location P is also based, at least in part, on whether a previous measurement of the electromagnetic signal has been made at a location Q, wherein $Q \neq P$.

8. The method of claim 7 wherein determining whether to make the measurement of the signal at the location P is also based, at least in part, on the age of the previous measurement of the electromagnetic signal at the location Q.

9. The method of claim 7 wherein determining whether to make the measurement of the signal at the location P is also based, at least in part, on the distance between the location P and the location Q.

10. The method of claim 1 wherein determining whether to make the measurement of the signal at the location P is also based, at least in part, on the fact that a measurement is proposed at a location S, wherein $S \neq P$.

11. The method of claim 10 wherein determining whether to make the measurement of the signal at the location P is also based, at least in part, on the distance between the location P and the location S.

12. The method of claim 1 wherein determining whether to make the measurement of the signal at the location P is also based, at least in part, on the fact that a measurement is not proposed at a location S, wherein $S \neq P$.

13. A method comprising:
receiving, by a data server, requests for empirical data;
generating a drive-test plan, by the data server, based on determining whether to make a measurement of an electromagnetic signal at a location P within a geographic region and to which a mobile test unit can be directed, based, at least in part, on
  (i) at least one of the requests for empirical data,
  (ii) a map of waypoints to which the mobile test unit can be directed for a measurement within the geographic region, and
  (iii) whether a previous measurement of the electromagnetic signal has been made at a location Q, wherein $Q \neq P$;
making measurements of electromagnetic signals, by the mobile test unit, in accordance with the drive-test plan generated by the data server;
receiving, by the data server, the measurements made by the mobile test unit; and
transmitting, by the data server, empirical data that is based on the measurements received.

14. The method of claim 13 wherein determining whether to make the measurement of the signal at the location P is also based, at least in part, on the age of the previous measurement of the electromagnetic signal at the location Q.

15. The method of claim 13 wherein determining whether to make the measurement of the signal at the location P is also based, at least in part, on the distance between the location P and the location Q.

16. The method of claim 13 wherein determining whether to make the measurement of the signal at the location P is also based, at least in part, on whether a previous measurement of the electromagnetic signal has been made at the location P.

17. The method of claim 16 wherein determining whether to make the measurement of the signal at the location P is also based, at least in part, on the age of the previous measurement of the electromagnetic signal at the location P.

18. The method of claim 13 wherein determining whether to make the measurement of the signal at the location P is also based, at least in part, on variability of the terrain at the location P.

19. A method comprising:
receiving, by a data server, requests for empirical data;
generating a drive-test plan, by the data server, based on determining whether to make a measurement of an electromagnetic signal at a location P within a geographic region and to which a mobile test unit can be directed, based, at least in part, on
  (i) at least one of the requests for empirical data,
  (ii) a map of waypoints to which the mobile test unit can be directed for a measurement within the geographic region, and
  (iii) variability of the terrain at the location P;
making measurements of electromagnetic signals, by the mobile test unit, in accordance with the drive-test plan generated by the data server;
receiving, by the data server, the measurements made by the mobile test unit; and
transmitting, by the data server, empirical data that is based on the measurements received.

20. The method of claim 19 wherein the variability is based on the standard deviation of the altitude at the location P.

* * * * *